US011102723B2

(12) United States Patent
Huang et al.

(10) Patent No.: US 11,102,723 B2
(45) Date of Patent: Aug. 24, 2021

(54) COMMUNICATION APPARATUS AND COMMUNICATION METHOD

(71) Applicant: Panasonic Intellectual Property Corporation of America, Torrance, CA (US)

(72) Inventors: Lei Huang, Singapore (SG); Yoshio Urabe, Nara (JP); Rojan Chitrakar, Singapore (SG)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 23 days.

(21) Appl. No.: 16/603,574

(22) PCT Filed: Mar. 1, 2018

(86) PCT No.: PCT/JP2018/007684
§ 371 (c)(1),
(2) Date: Oct. 7, 2019

(87) PCT Pub. No.: WO2018/198528
PCT Pub. Date: Nov. 1, 2018

(65) Prior Publication Data
US 2020/0045636 A1  Feb. 6, 2020

Related U.S. Application Data

(60) Provisional application No. 62/491,113, filed on Apr. 27, 2017.

(30) Foreign Application Priority Data

Jul. 6, 2017  (JP) .............................. JP2017-133118

(51) Int. Cl.
*H04W 52/02* (2009.01)
*H04L 12/861* (2013.01)
(Continued)

(52) U.S. Cl.
CPC .......... *H04W 52/0235* (2013.01); *H04L 49/90* (2013.01); *H04W 84/12* (2013.01); *H04W 88/06* (2013.01)

(58) Field of Classification Search
CPC ...... H04L 49/90; H04L 12/861; H04W 88/06; H04W 84/12; H04W 52/02; H04W 52/0235; H04W 52/0229
(Continued)

(56) References Cited

U.S. PATENT DOCUMENTS 9,544,848 B2 * 1/2017 Jafarian ............ H04W 52/0229
9,826,482 B2 * 11/2017 Park ..................... H04L 5/0044
(Continued)

OTHER PUBLICATIONS

The Extended European Search Report dated Apr. 7, 2020 for the related European Patent Application No. 18791211.8, 10 pages.
(Continued)

*Primary Examiner* — Man U Phan
(74) *Attorney, Agent, or Firm* — Seed IP Law Group LLP

(57) ABSTRACT

A communication apparatus of the present disclosure comprises a first receiver which, in operation, receives a downlink data frame from a base station; a decoder which, in operation, decodes data included in the received downlink data frame; a signal generator which, when the decoded data indicates that there is no buffered traffic for the communication apparatus, generates an uplink frame that includes acknowledgement information and a wake-up radio (WUR) mode request indicating a request to transit to the WUR mode from a primary connectivity radio (PCR) mode; and a transmitter which, in operation, transmits the uplink frame to the base station.

14 Claims, 32 Drawing Sheets

(51) Int. Cl.
  *H04W 84/12* (2009.01)
  *H04W 88/06* (2009.01)
(58) Field of Classification Search
  USPC ..................................................... 370/311
  See application file for complete search history.

(56) References Cited

U.S. PATENT DOCUMENTS

| | | | | |
|---|---|---|---|---|
| 9,924,462 | B2* | 3/2018 | Huang | H04W 52/0229 |
| 10,194,394 | B2* | 1/2019 | Huang | H04W 52/0235 |
| 10,499,335 | B2* | 12/2019 | Huang | H04W 52/0216 |
| 10,687,282 | B2* | 6/2020 | Huang | H04W 52/0248 |
| 2003/0119568 | A1* | 6/2003 | Menard | H04W 52/0229 |
| | | | | 455/572 |
| 2014/0112226 | A1 | 4/2014 | Jafarian et al. | |
| 2016/0381636 | A1 | 12/2016 | Park et al. | |
| 2017/0332327 | A1* | 11/2017 | Fang | H04L 5/0007 |
| 2018/0288703 | A1* | 10/2018 | Sun | H04W 52/0229 |
| 2019/0327672 | A1* | 10/2019 | Hwang | H04L 5/0048 |
| 2019/0357143 | A1* | 11/2019 | Wang | H04W 40/244 |
| 2020/0029276 | A1* | 1/2020 | Kim | H04W 80/02 |
| 2020/0196243 | A1* | 6/2020 | Kim | H04W 56/00 |

OTHER PUBLICATIONS

International Search Report of PCT application No. PCT/JP2018/007684 dated May 22, 2018.
IEEE 802.11-17/0379r0, "SFD MAC proposal", Mar. 2017.
IEEE 802.11-17/0342r4, "WUR Negotiation and Acknowledgement Procedure Follow up", Mar. 2017.
IEEE 802.11-17/0071r0, "High Level MAC Concept for WUR", Jan. 2017.

* cited by examiner

[Fig. 1]
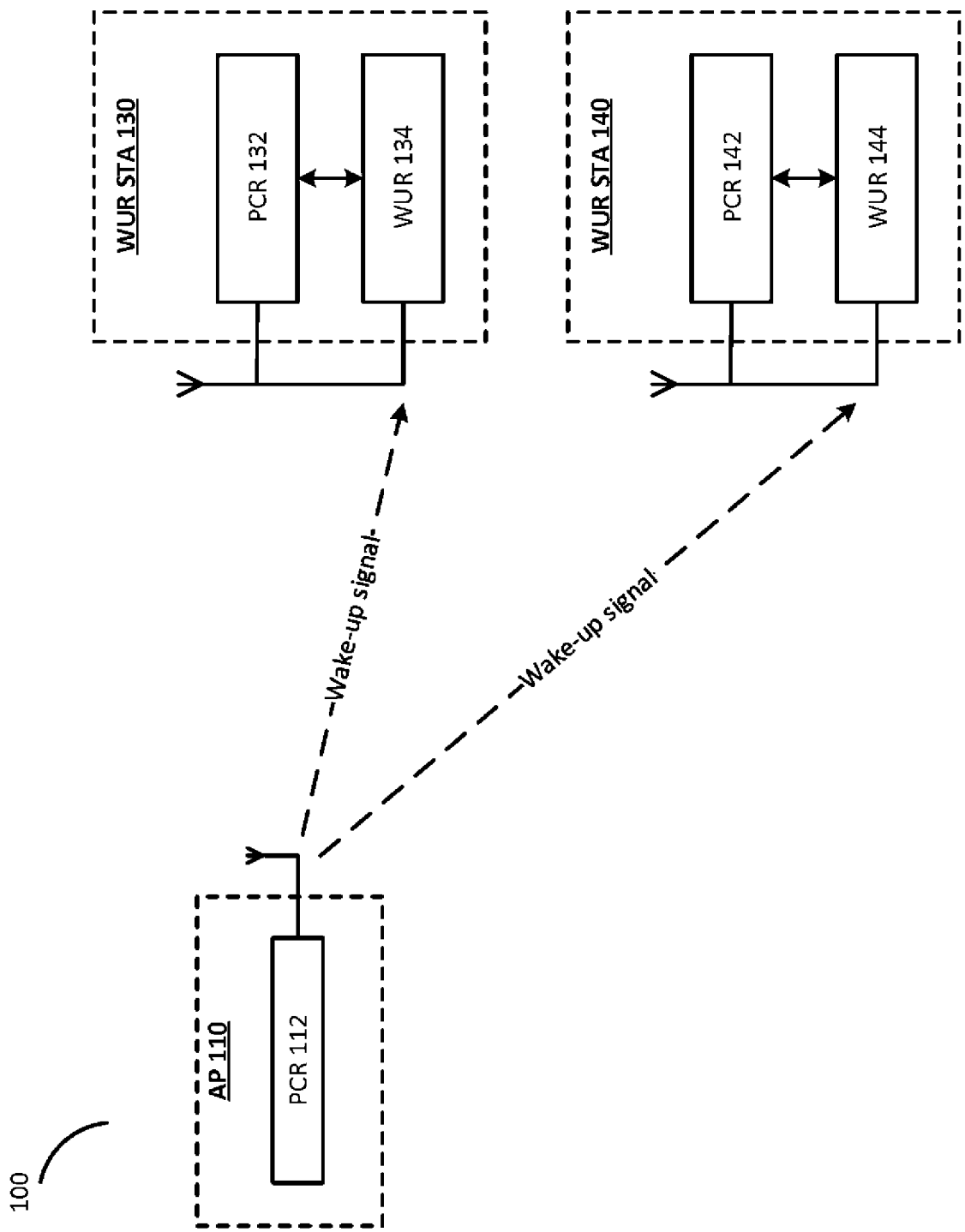

[Fig. 2A]
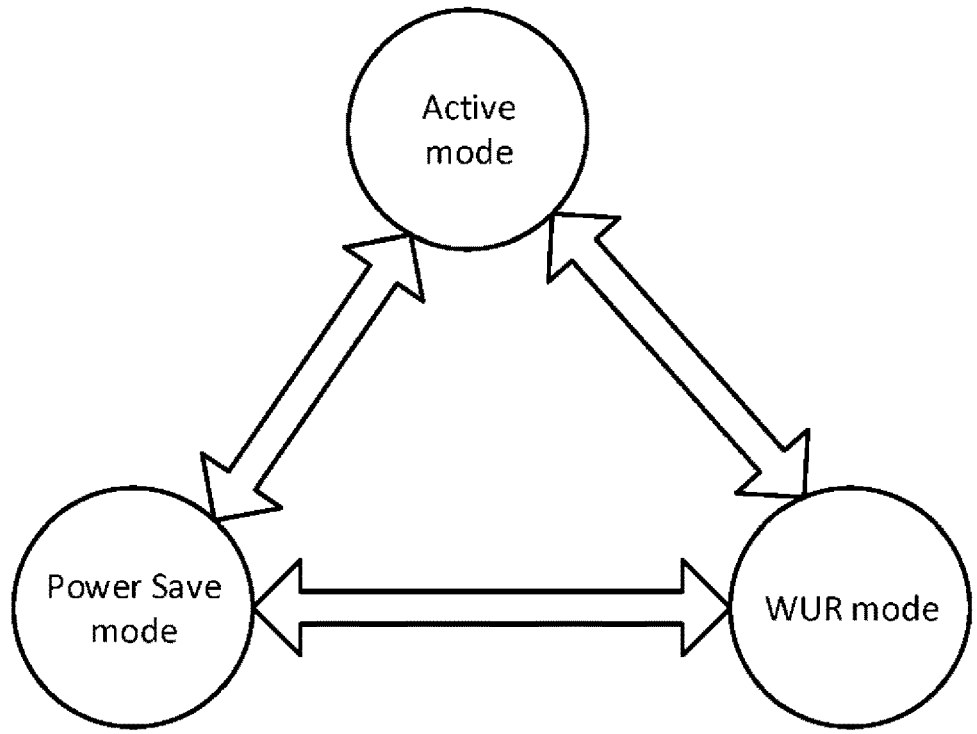
[Fig. 2B]
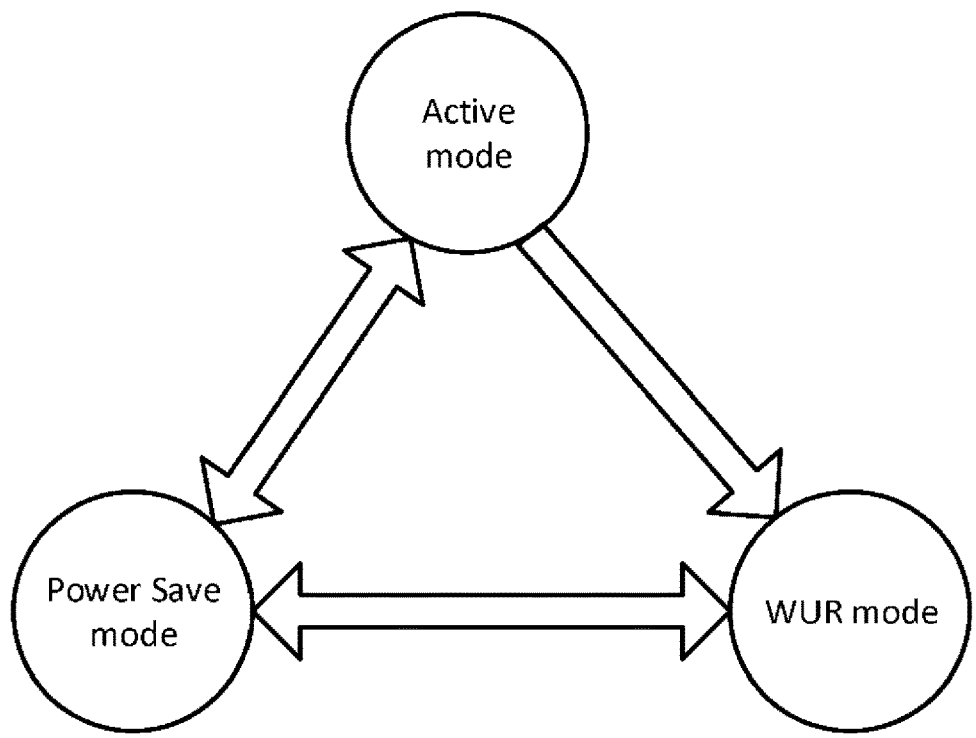

[Fig. 2C]
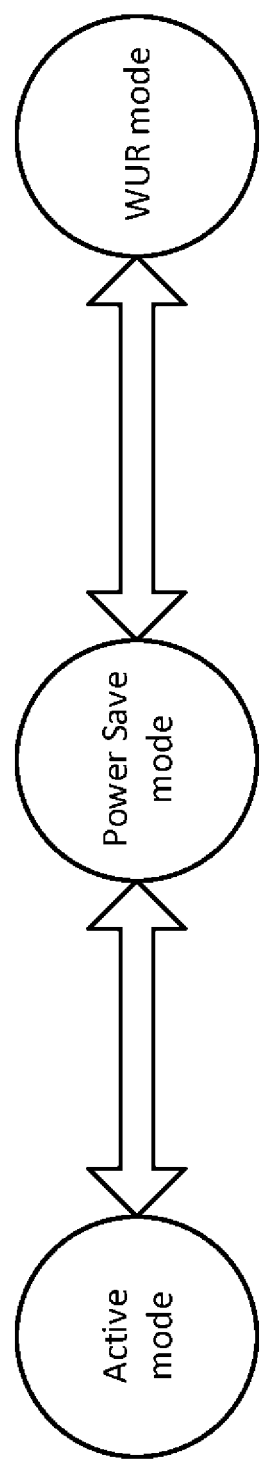

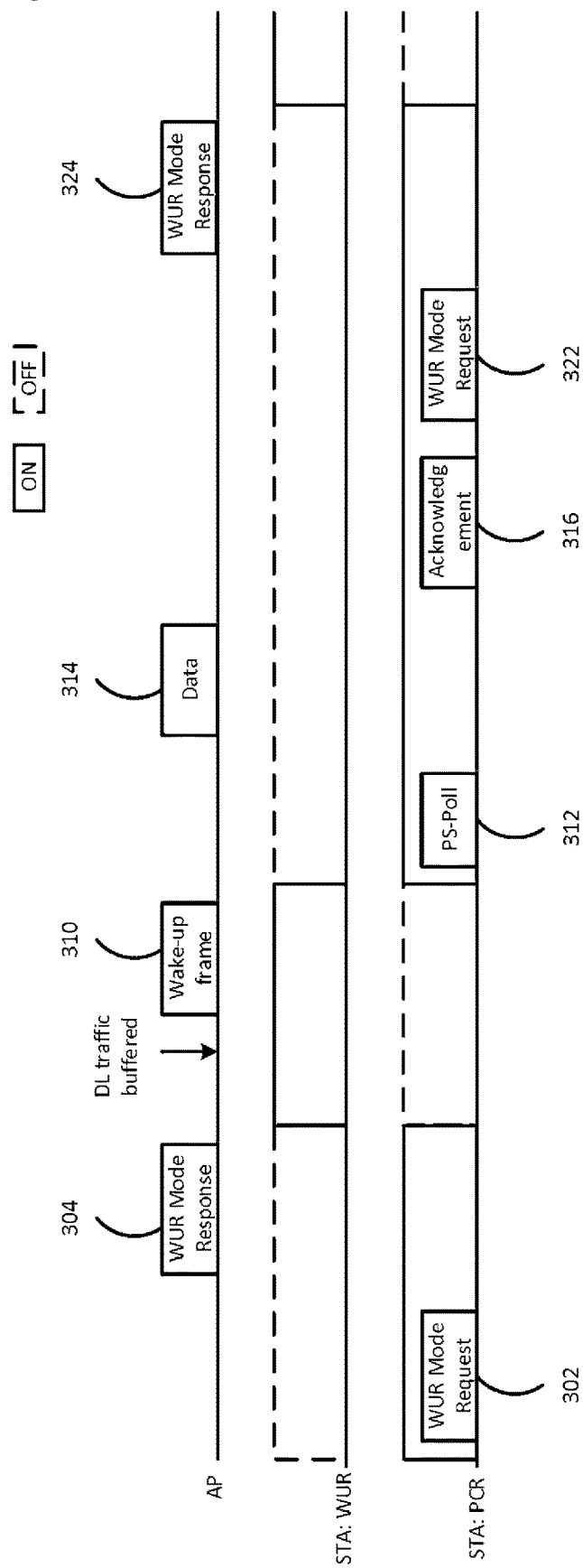
[Fig. 3A]

[Fig. 3B]
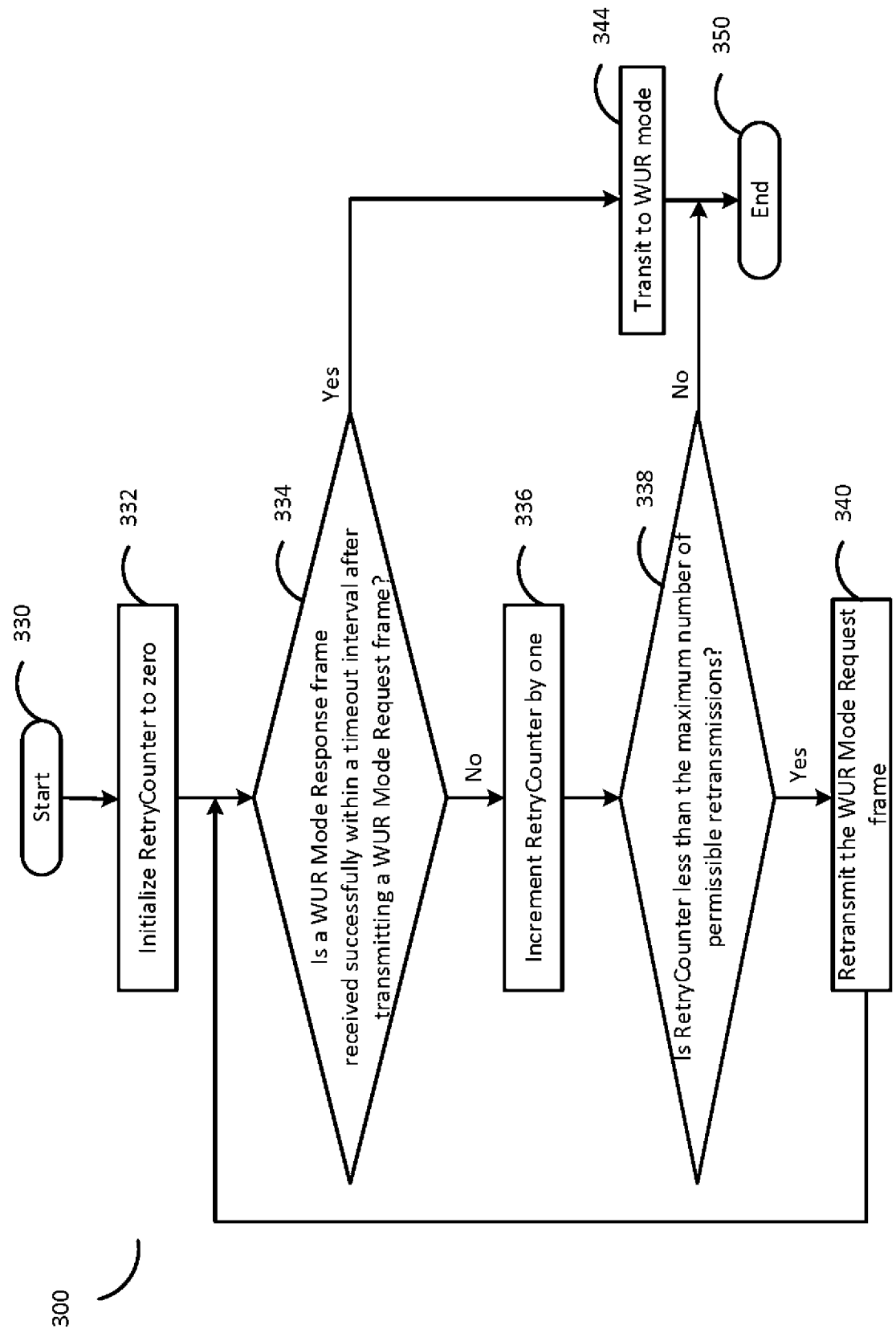

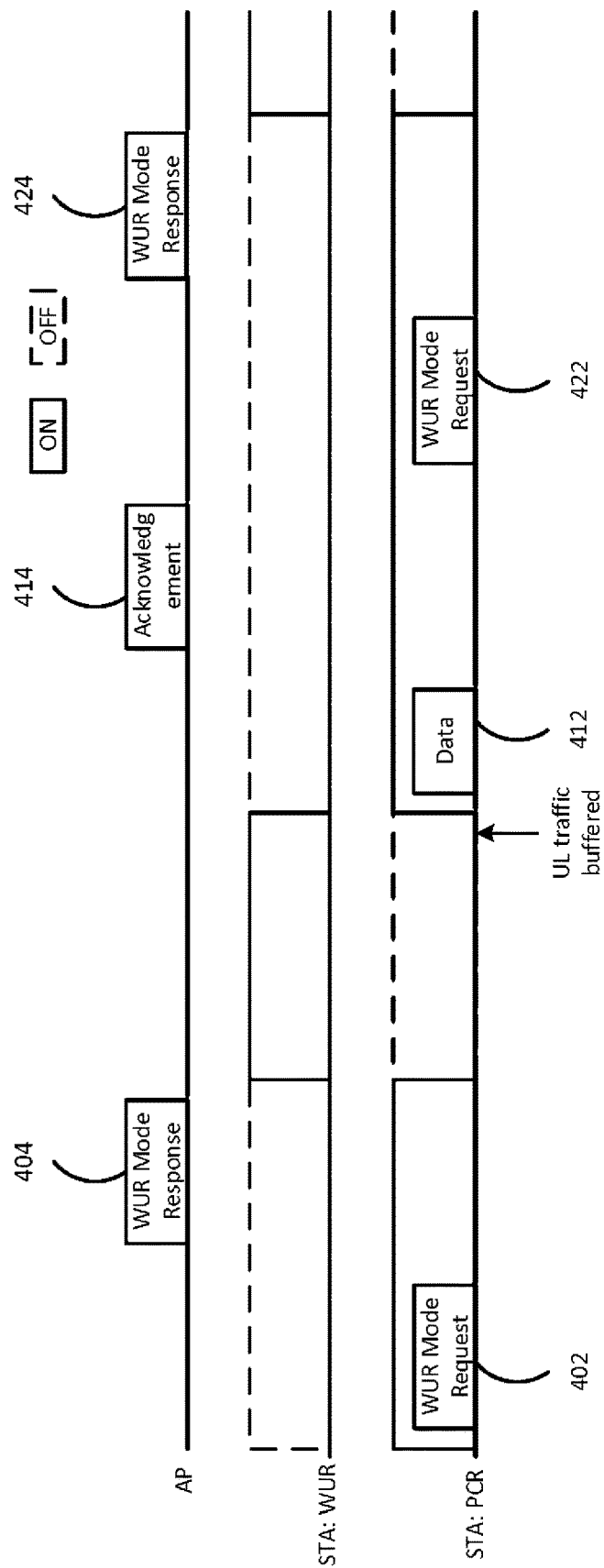
[Fig. 4]

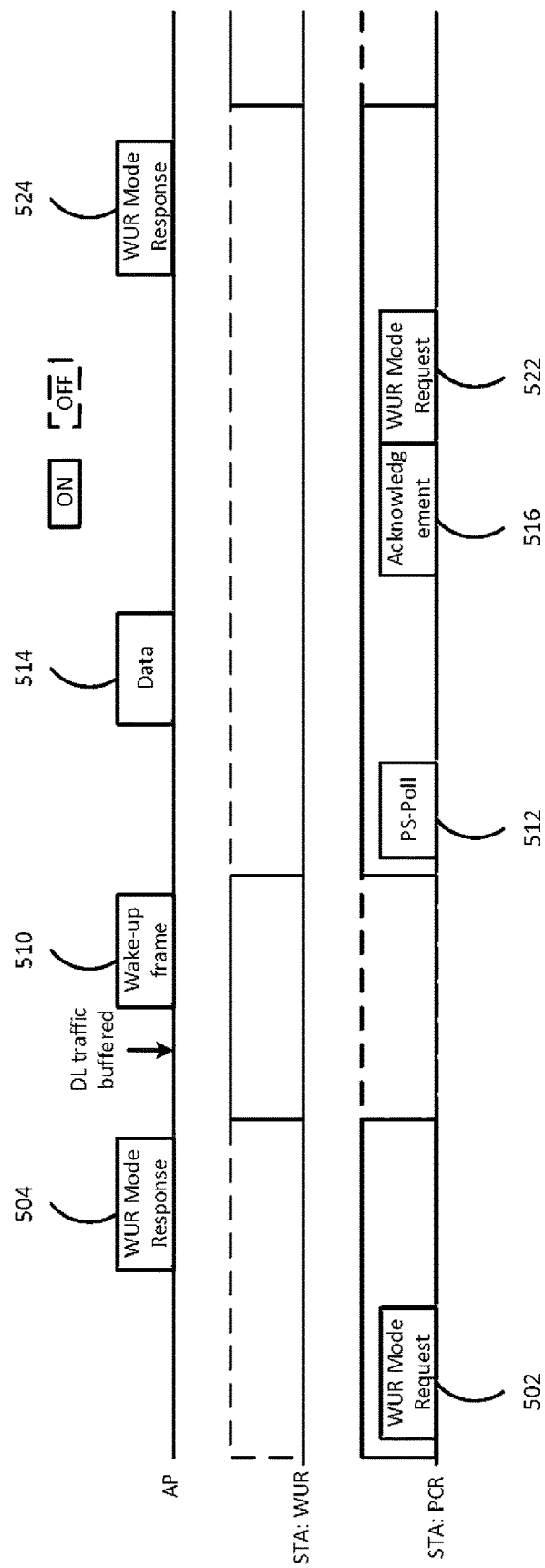
[Fig. 5A]

[Fig. 5B]
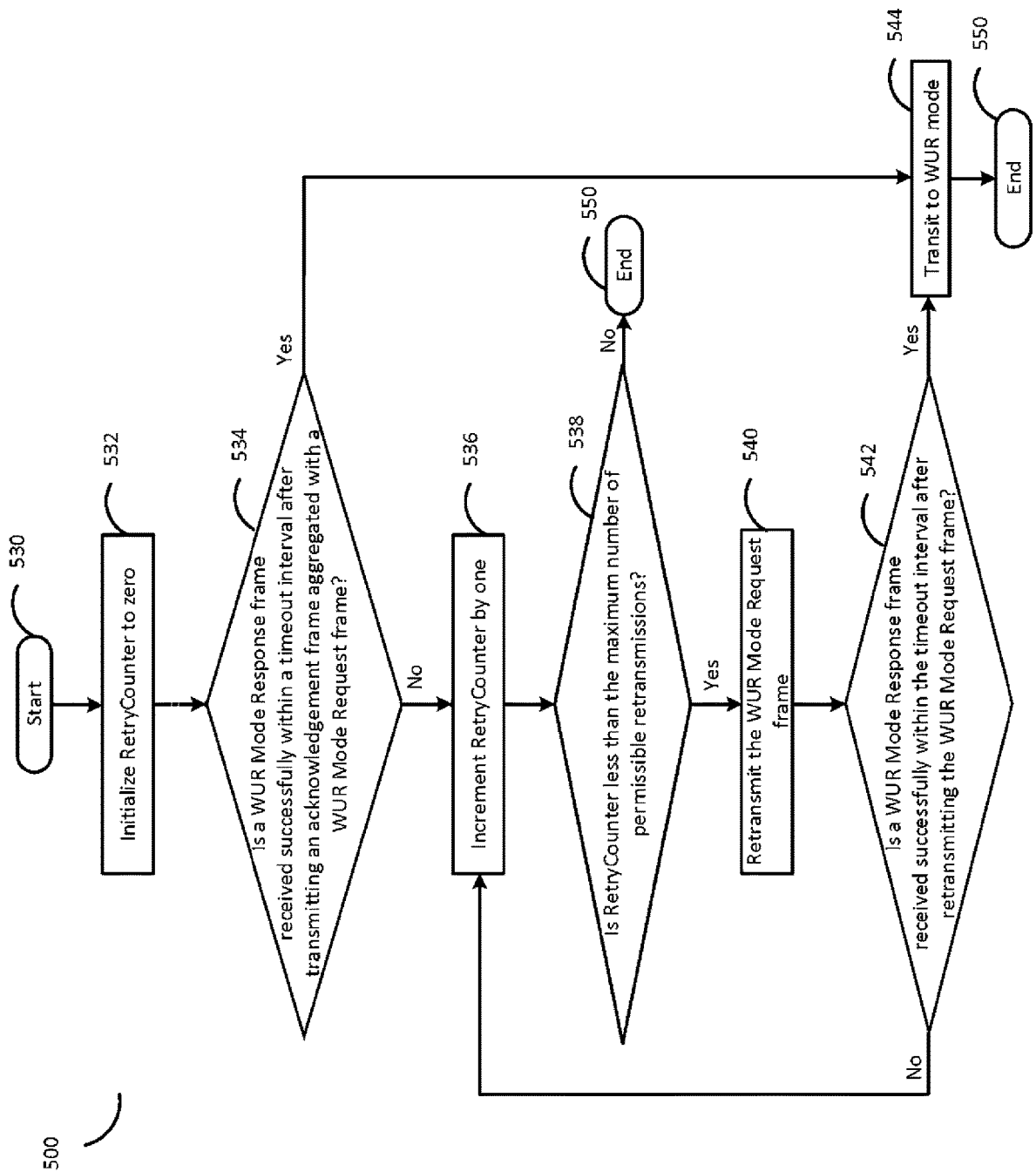

[Fig. 6A]
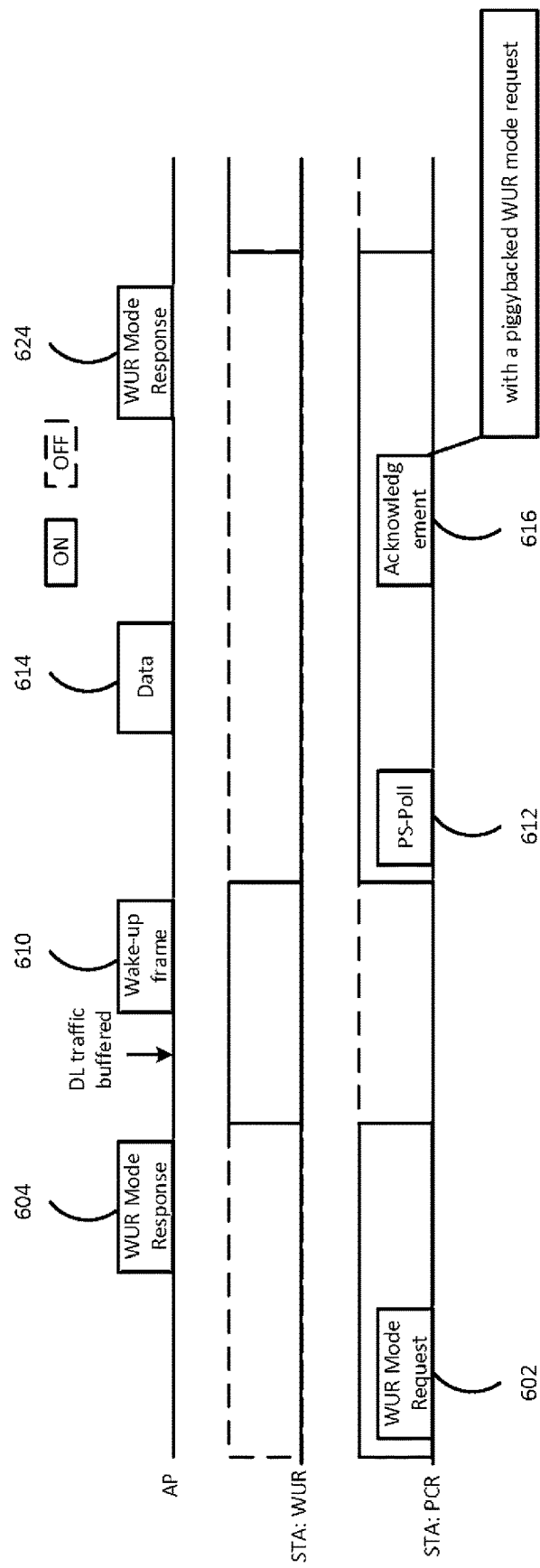

[Fig. 6B]
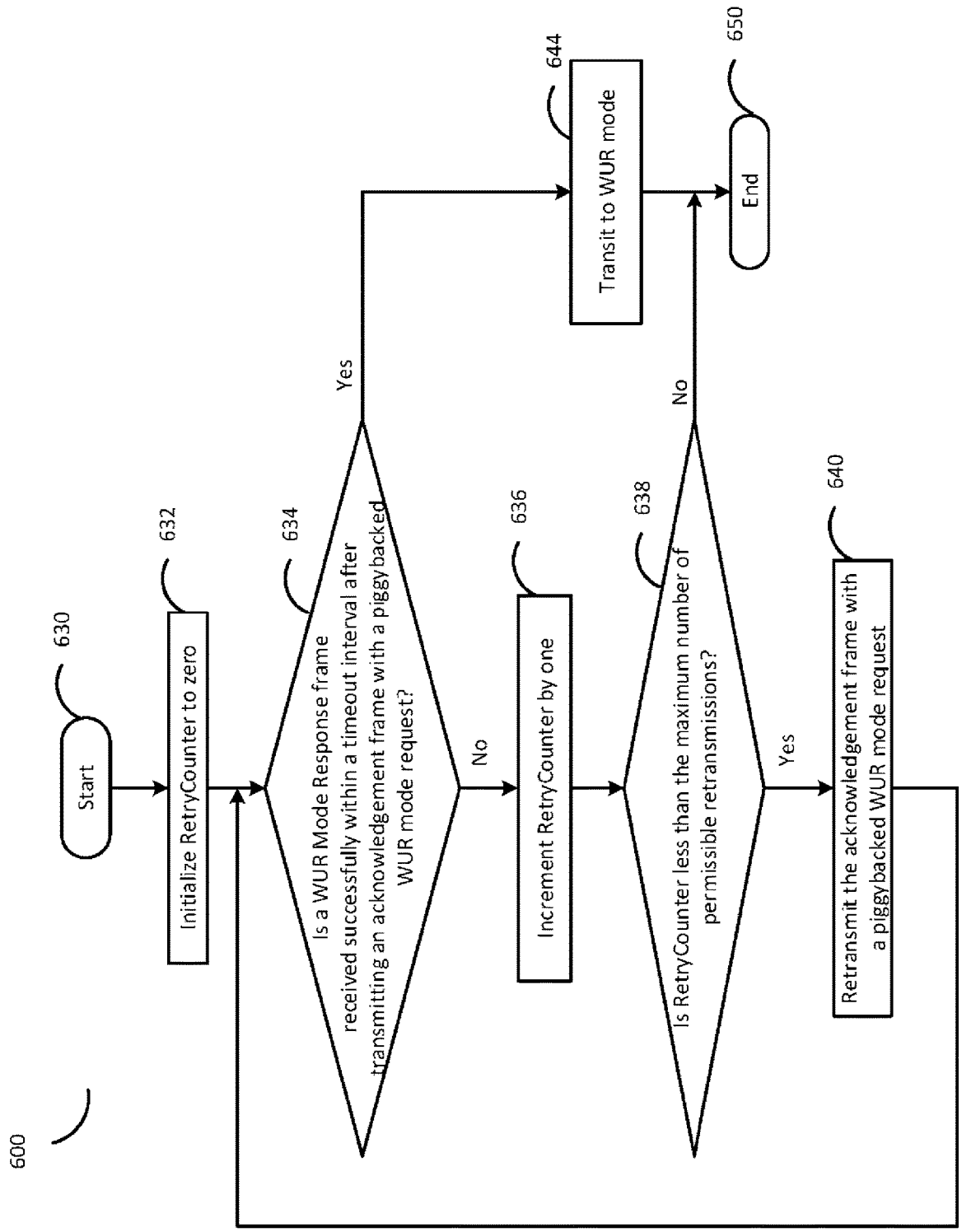

[Fig. 7A]
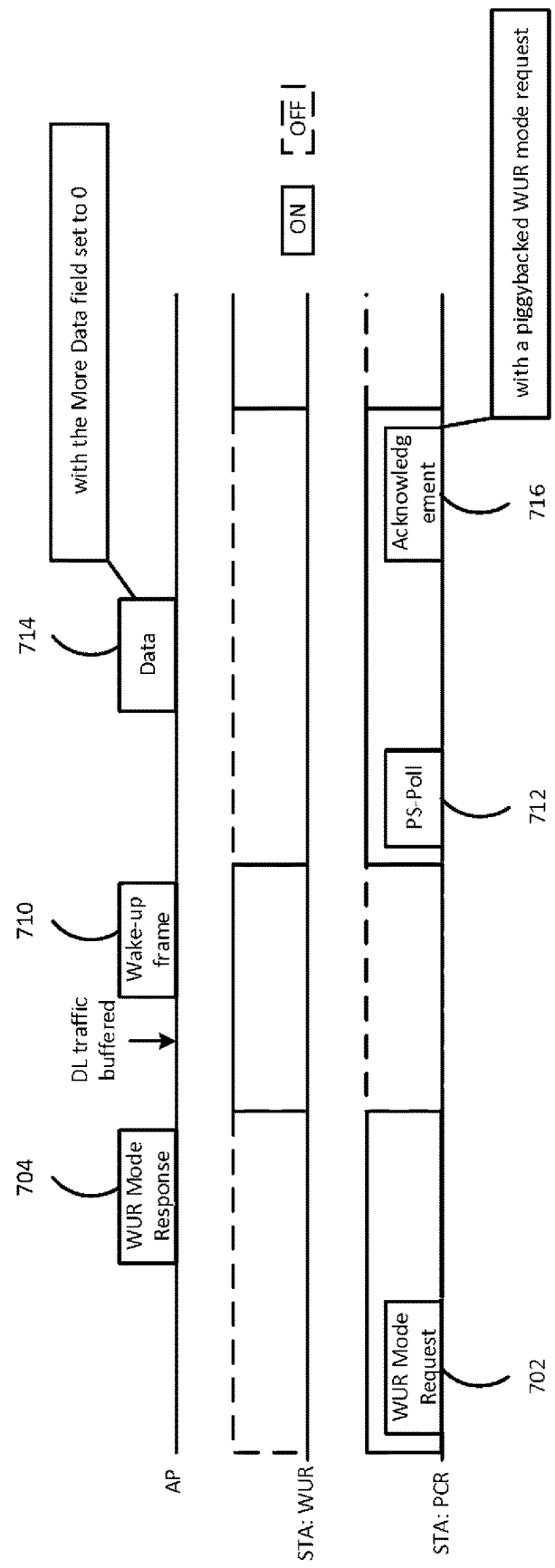

[Fig. 7B]
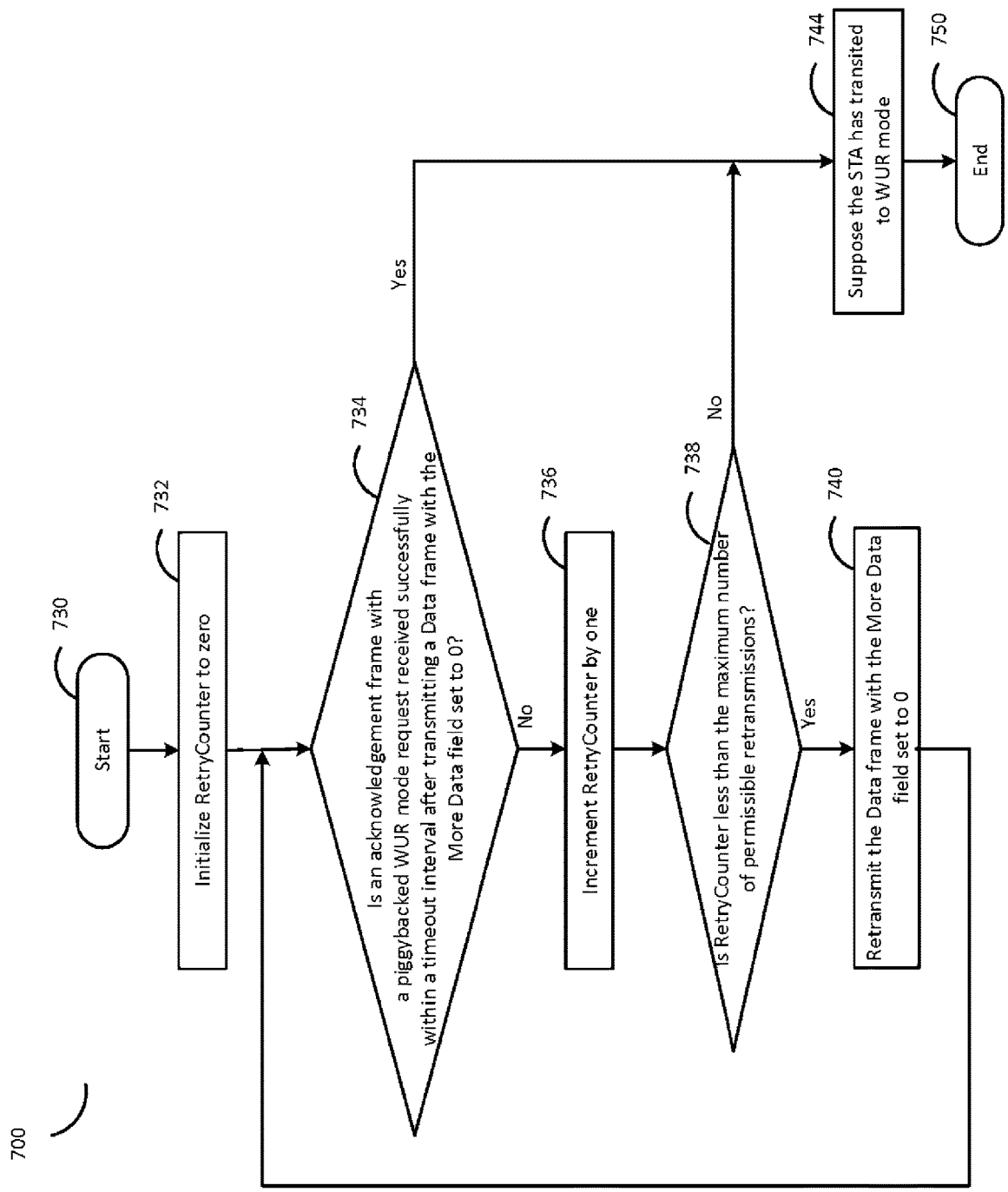

[Fig. 8A]
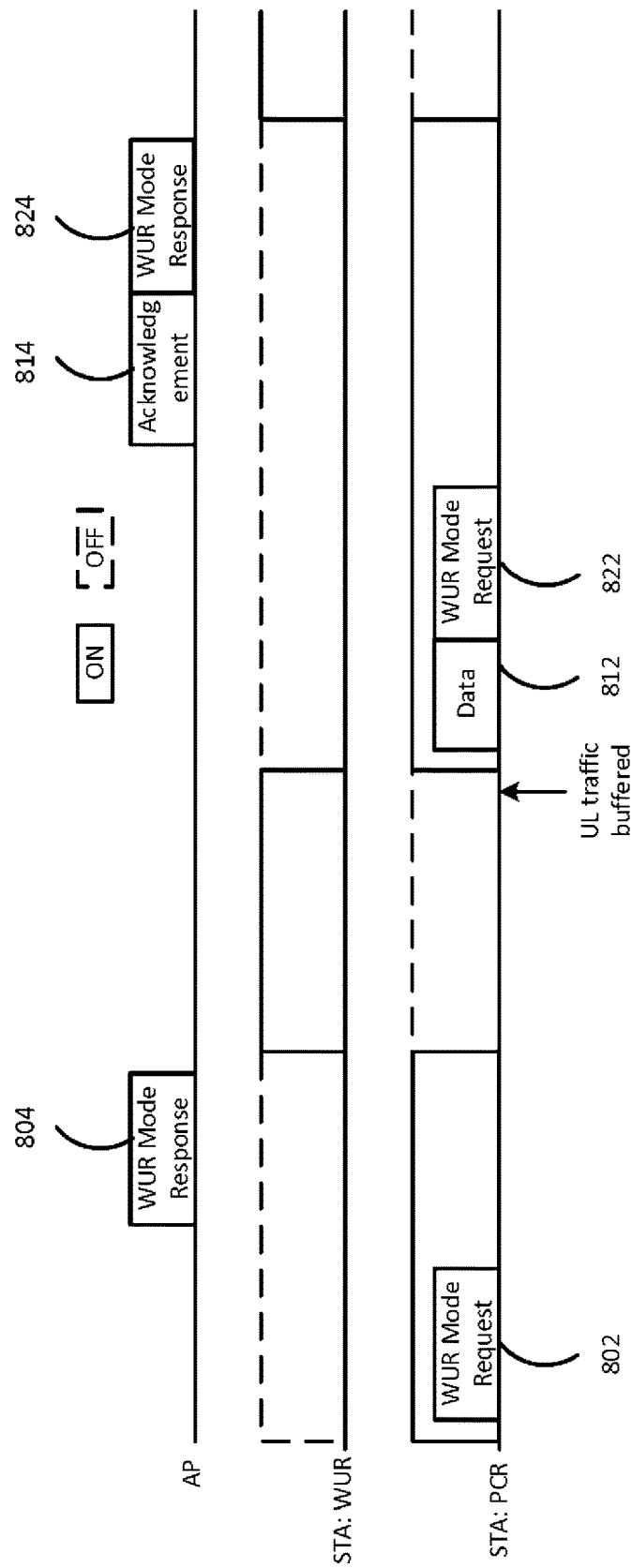

[Fig. 8B]
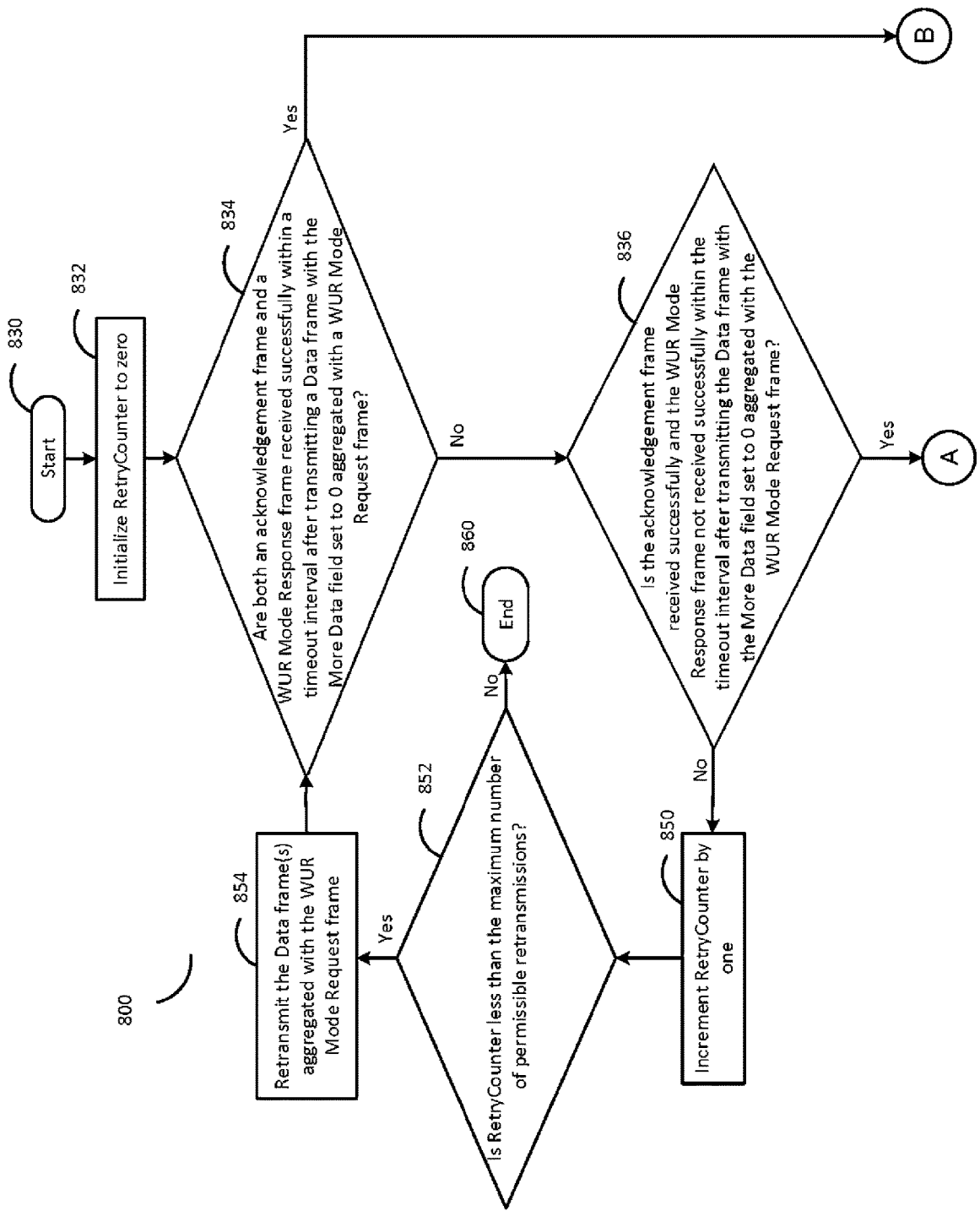

[Fig. 8C]
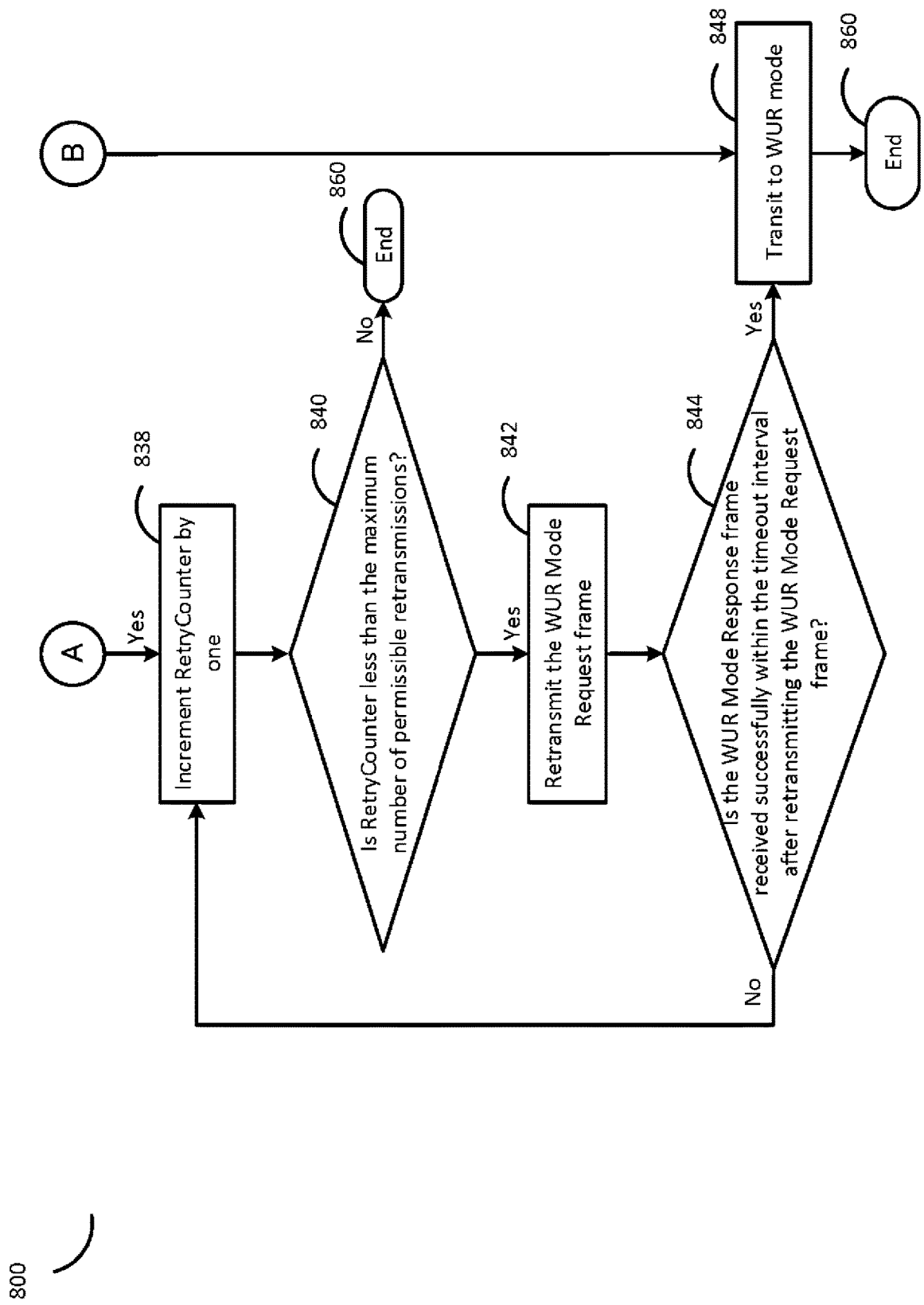

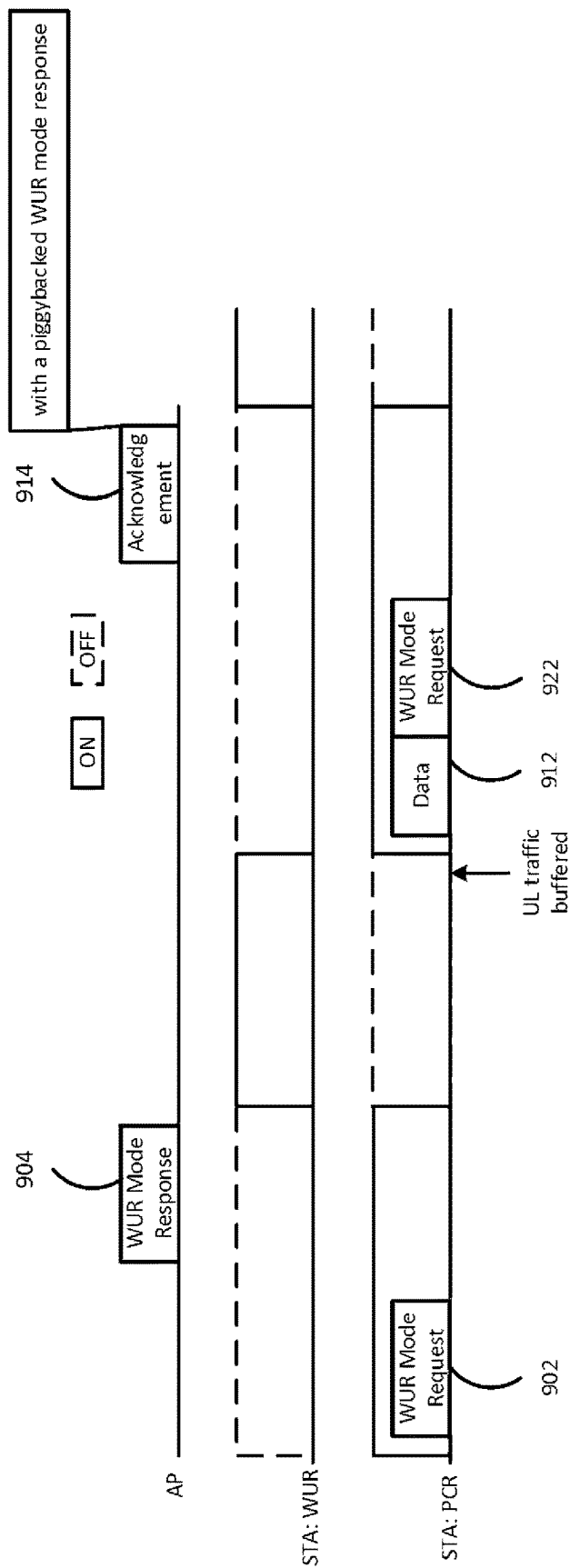
[Fig. 9A]

[Fig. 9B]
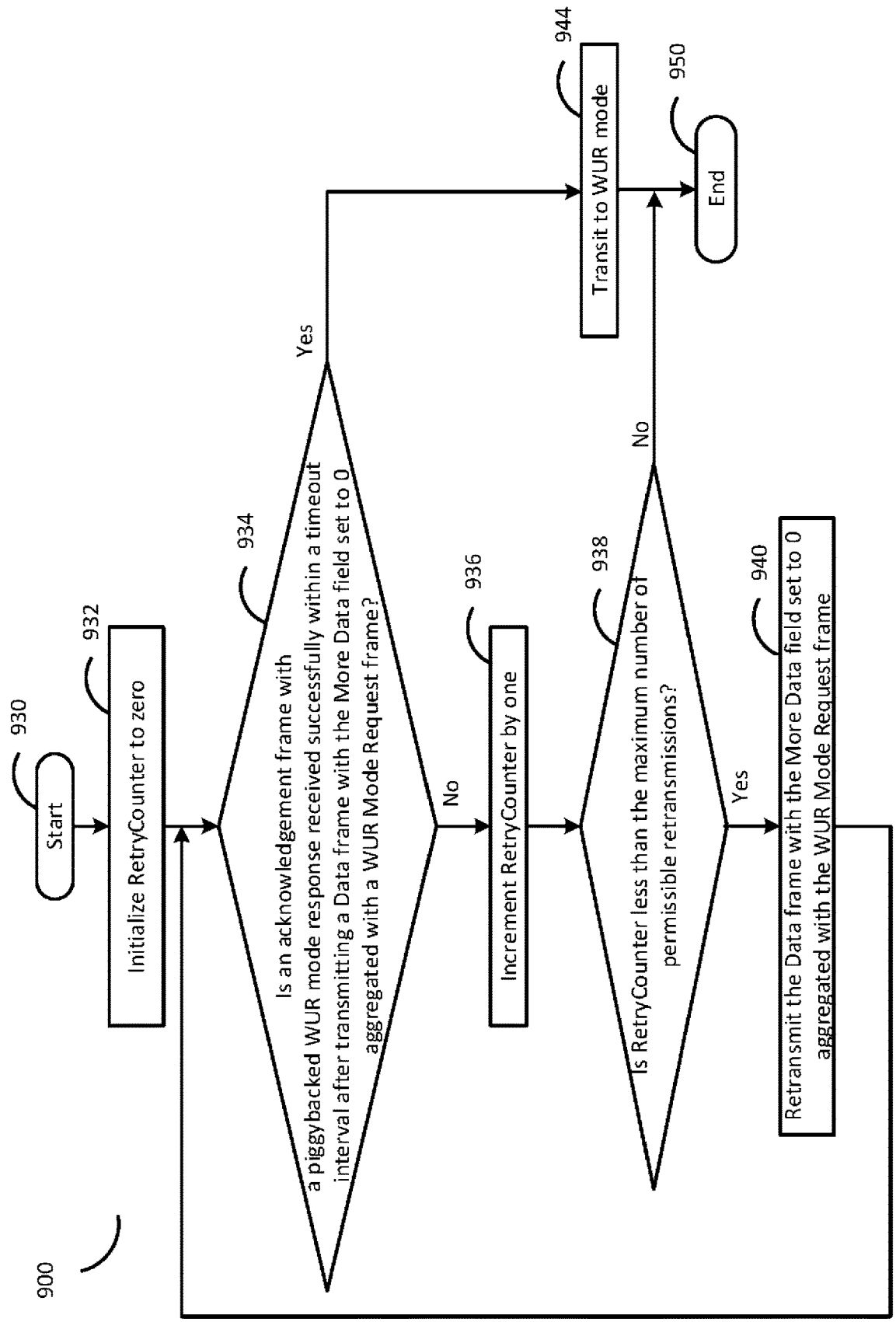

[Fig. 10A]
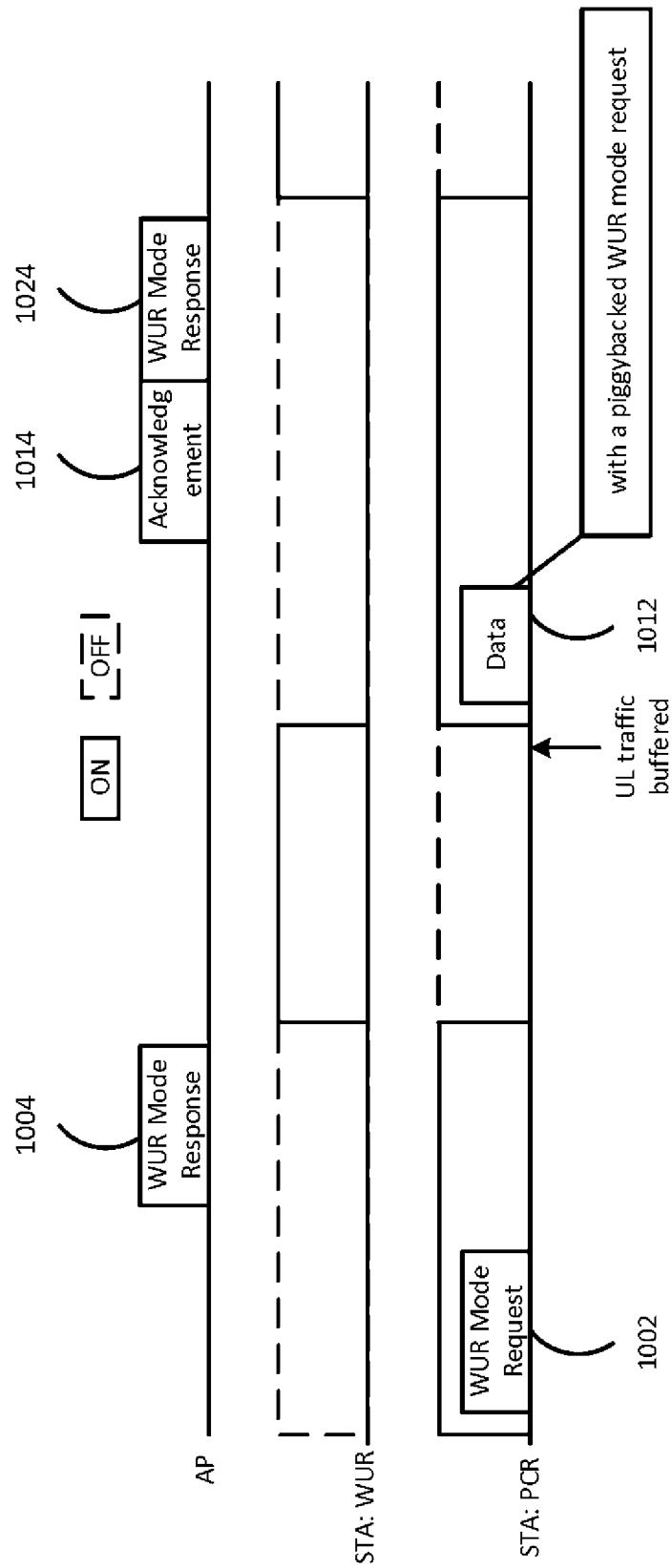

[Fig. 10B]
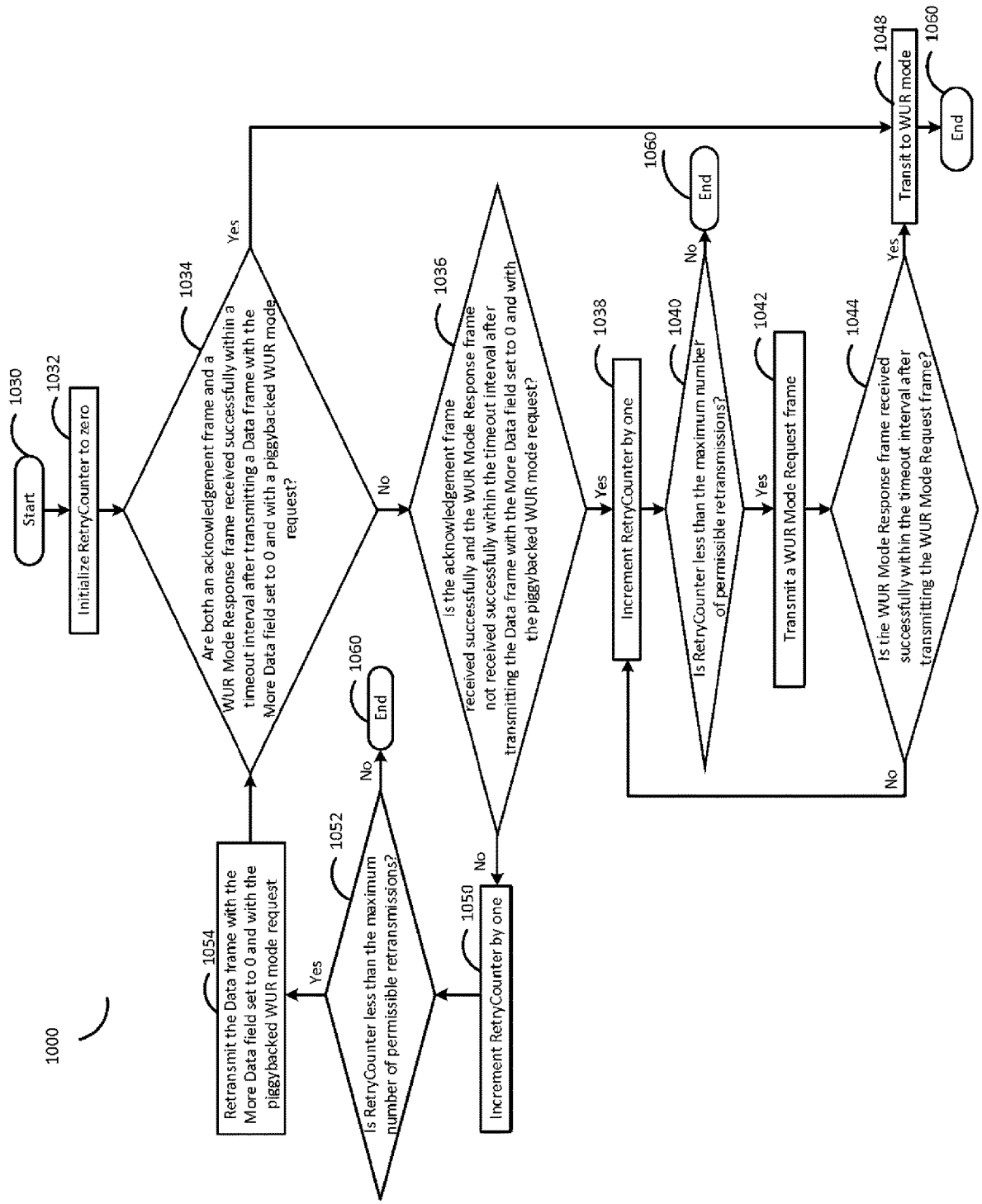

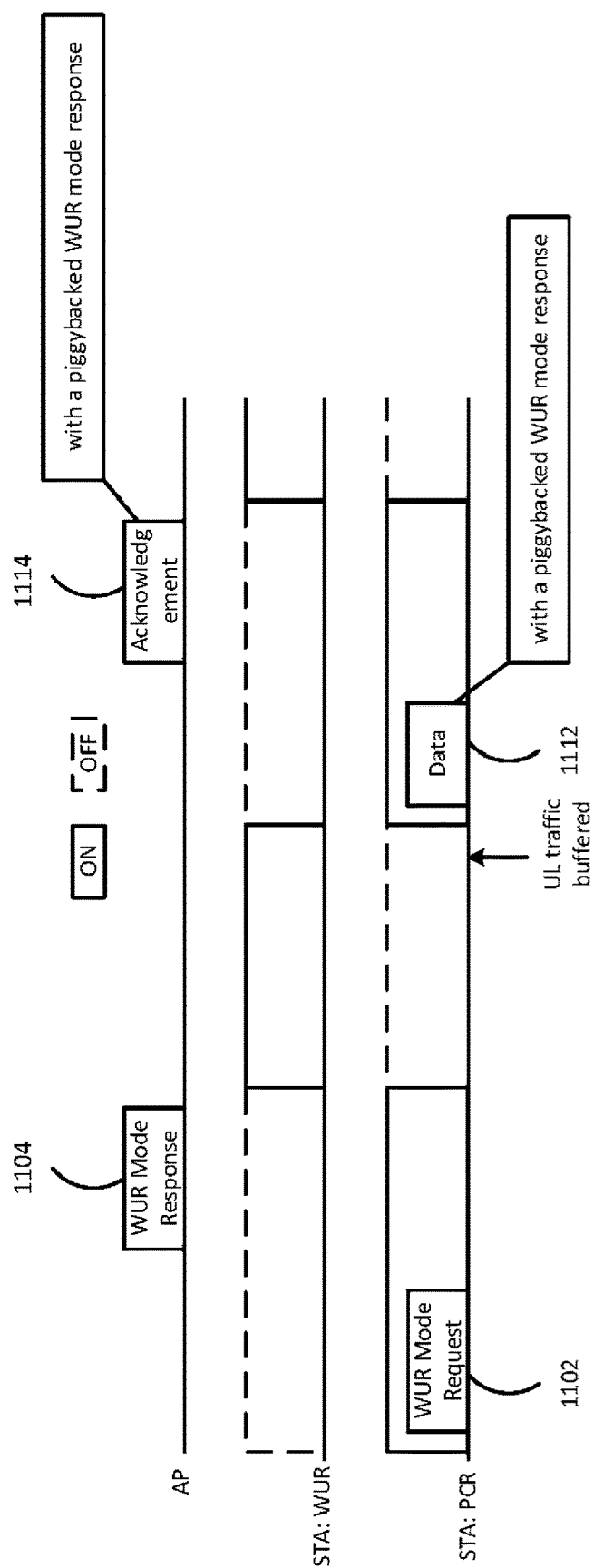
[Fig. 11A]

[Fig. 11B]
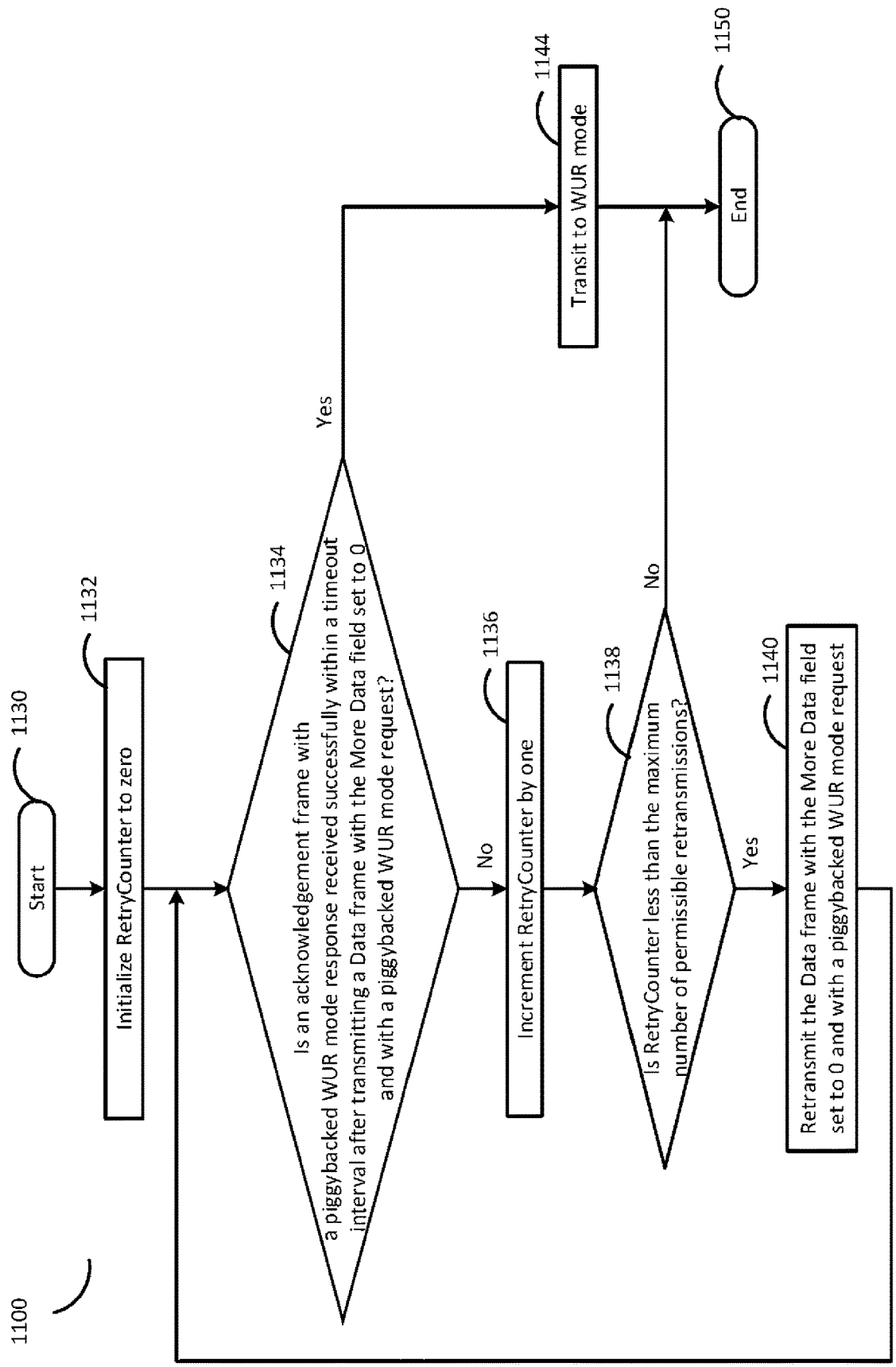

[Fig. 12A]
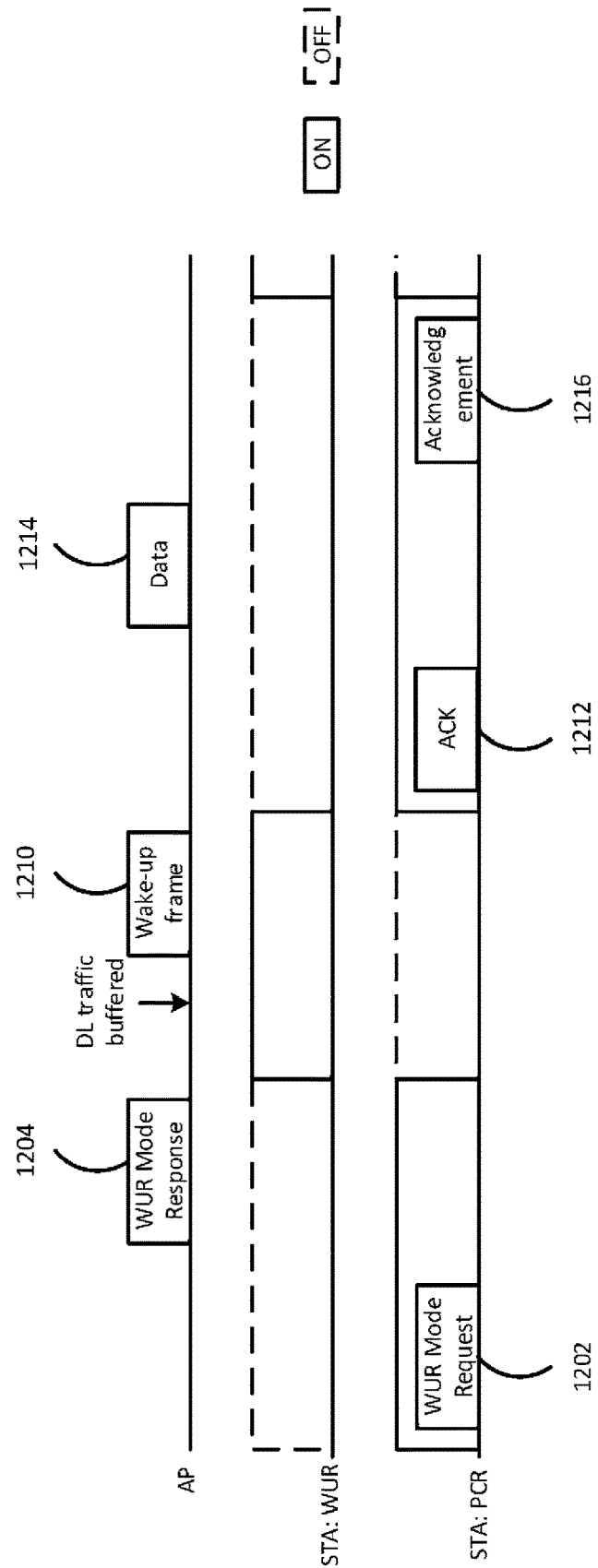

[Fig. 12B]
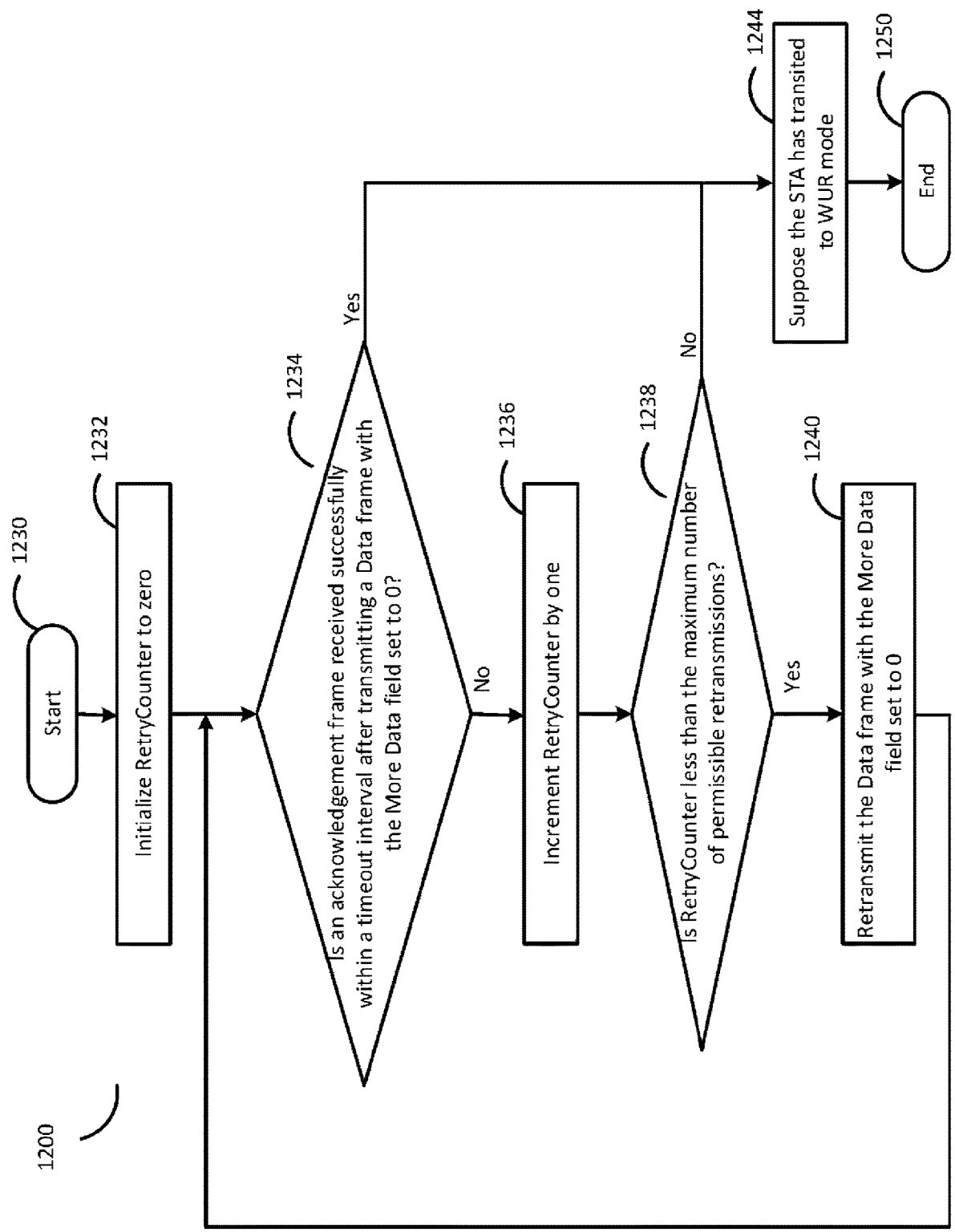

[Fig. 13A]
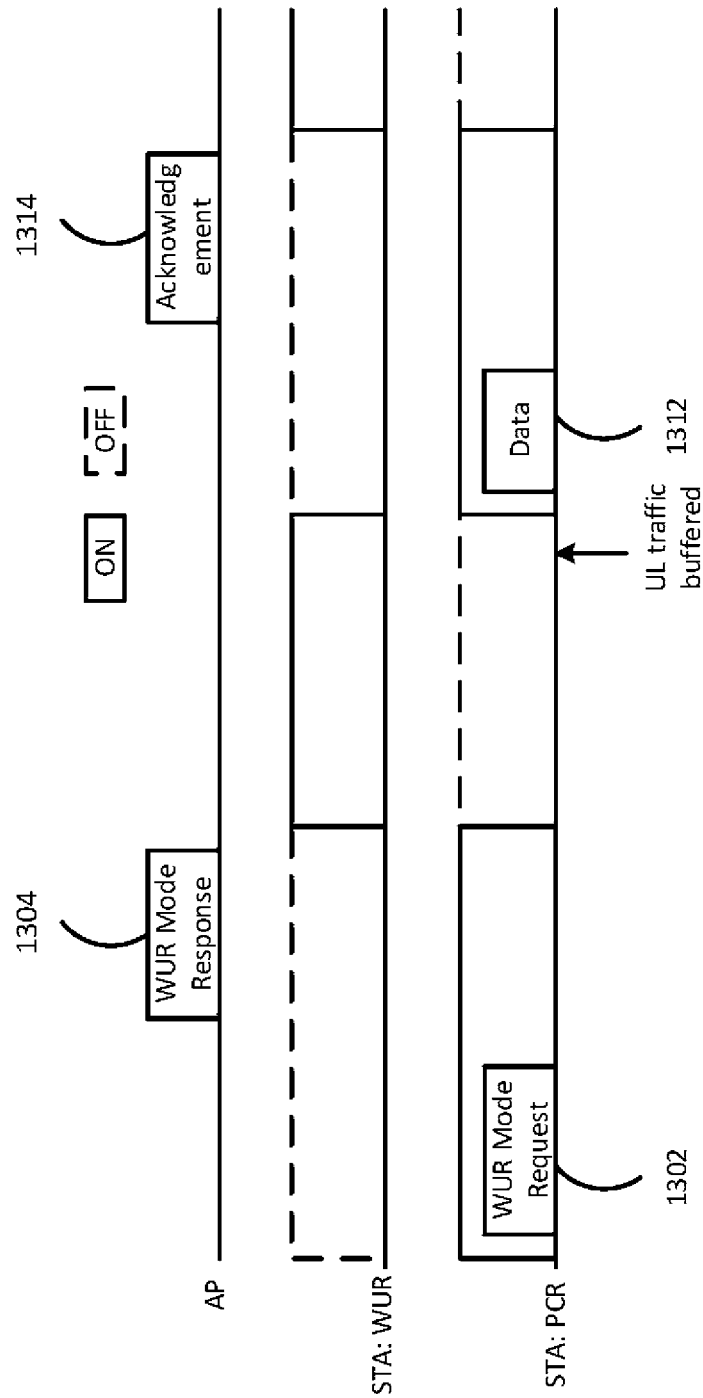

[Fig. 13B]
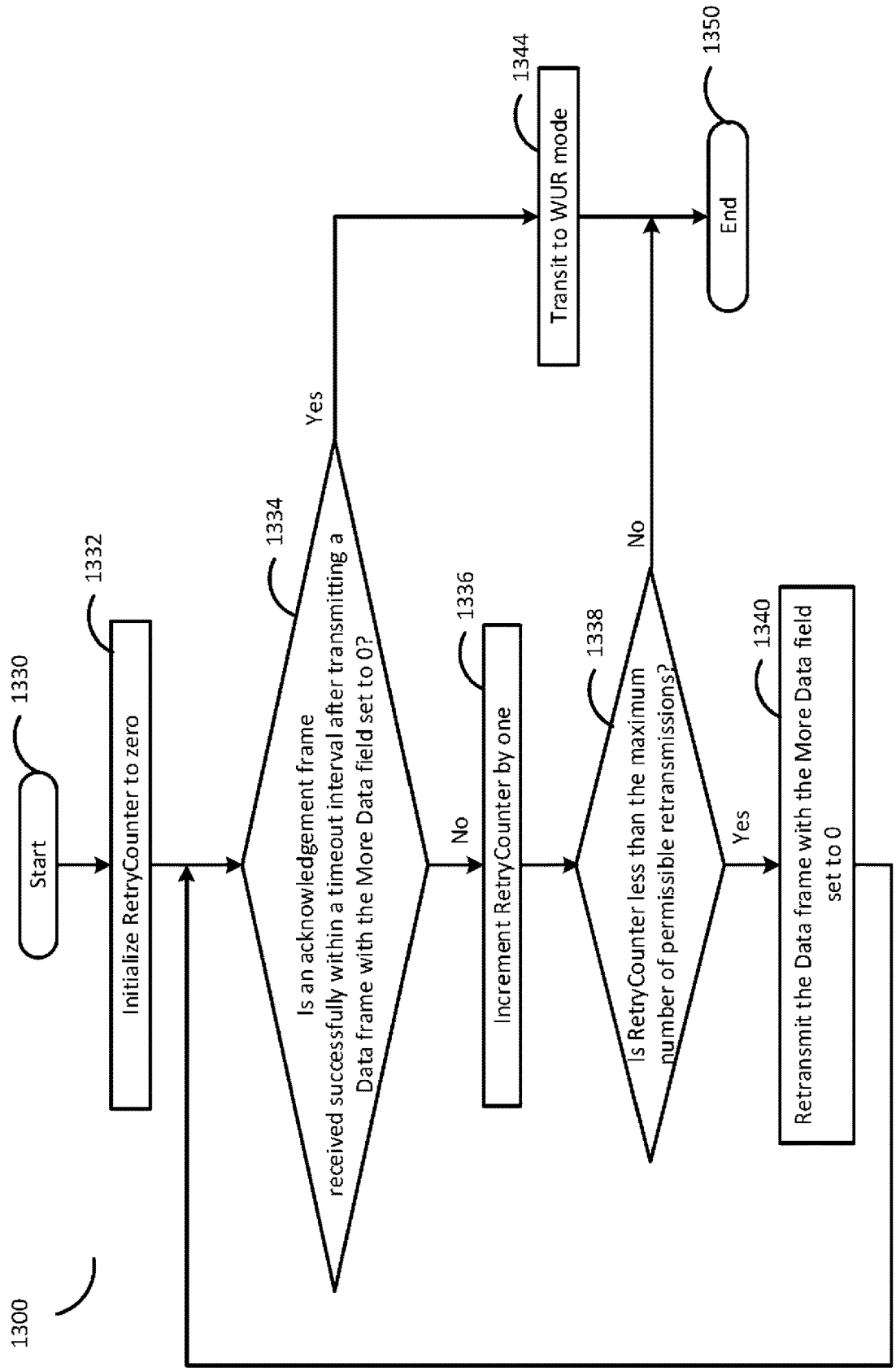

[Fig. 14]
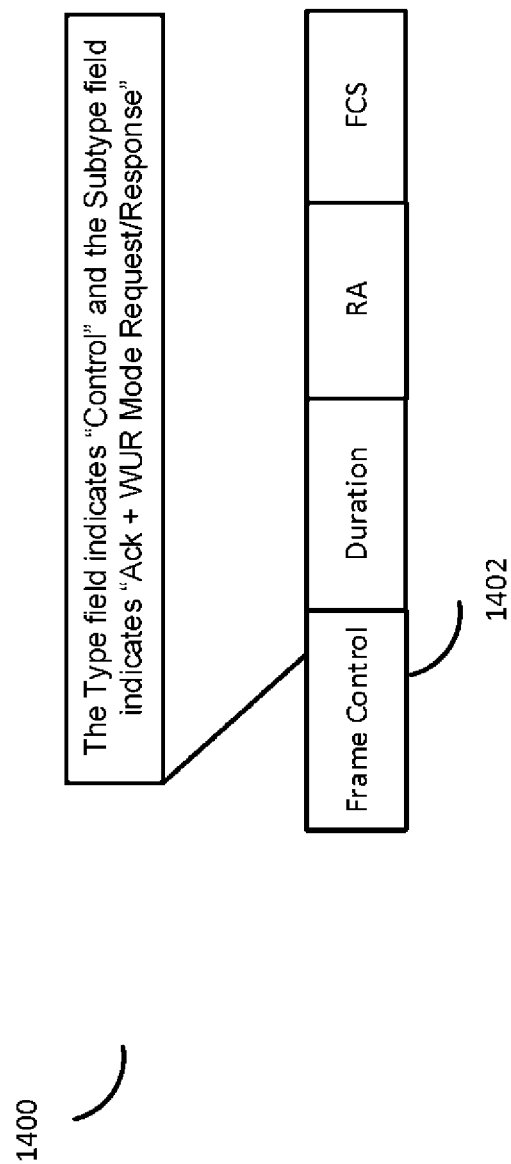

[Fig. 15]
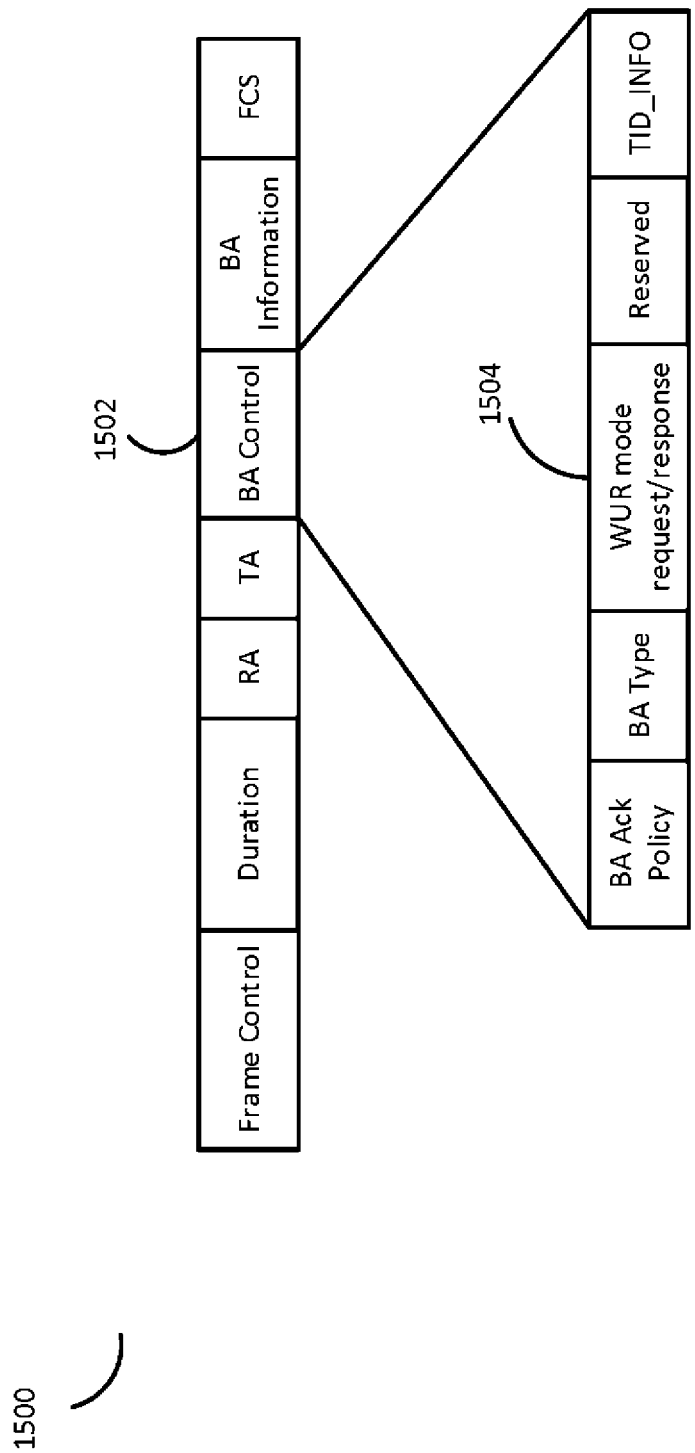

[Fig. 16]

1600: The Type field indicates "Data" and the Subtype field indicates "QoS Data + WUR Mode Request"

1602: Frame Control | Duration | Address 1 | Address 2 | Address 3 | Sequence Control | Address 4 | QoS Control | HT Control | Frame Body | FCS

[Fig. 17]
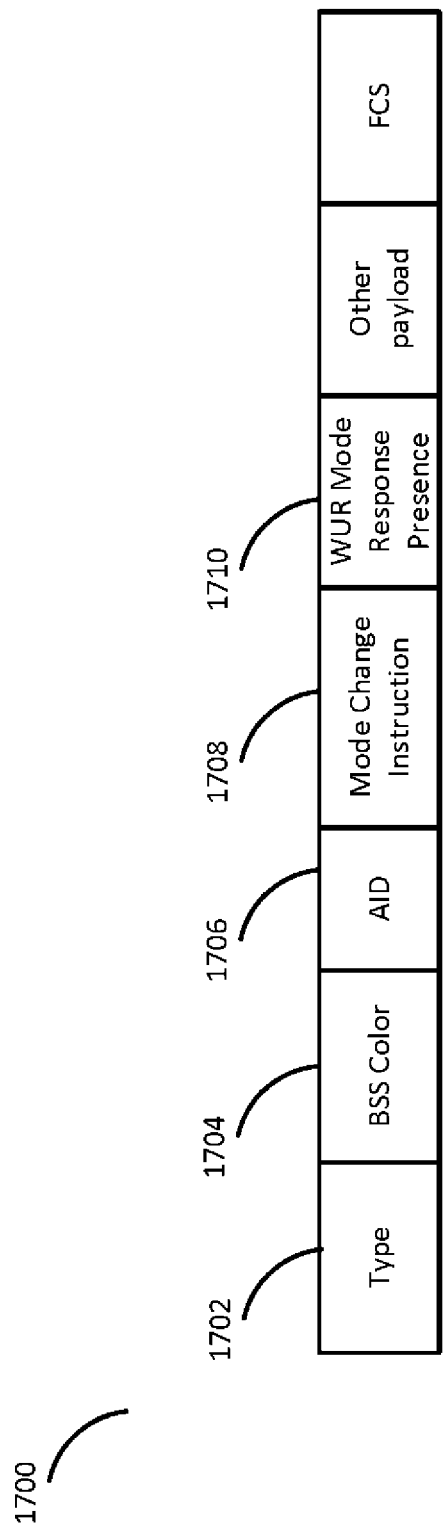

[Fig. 18]
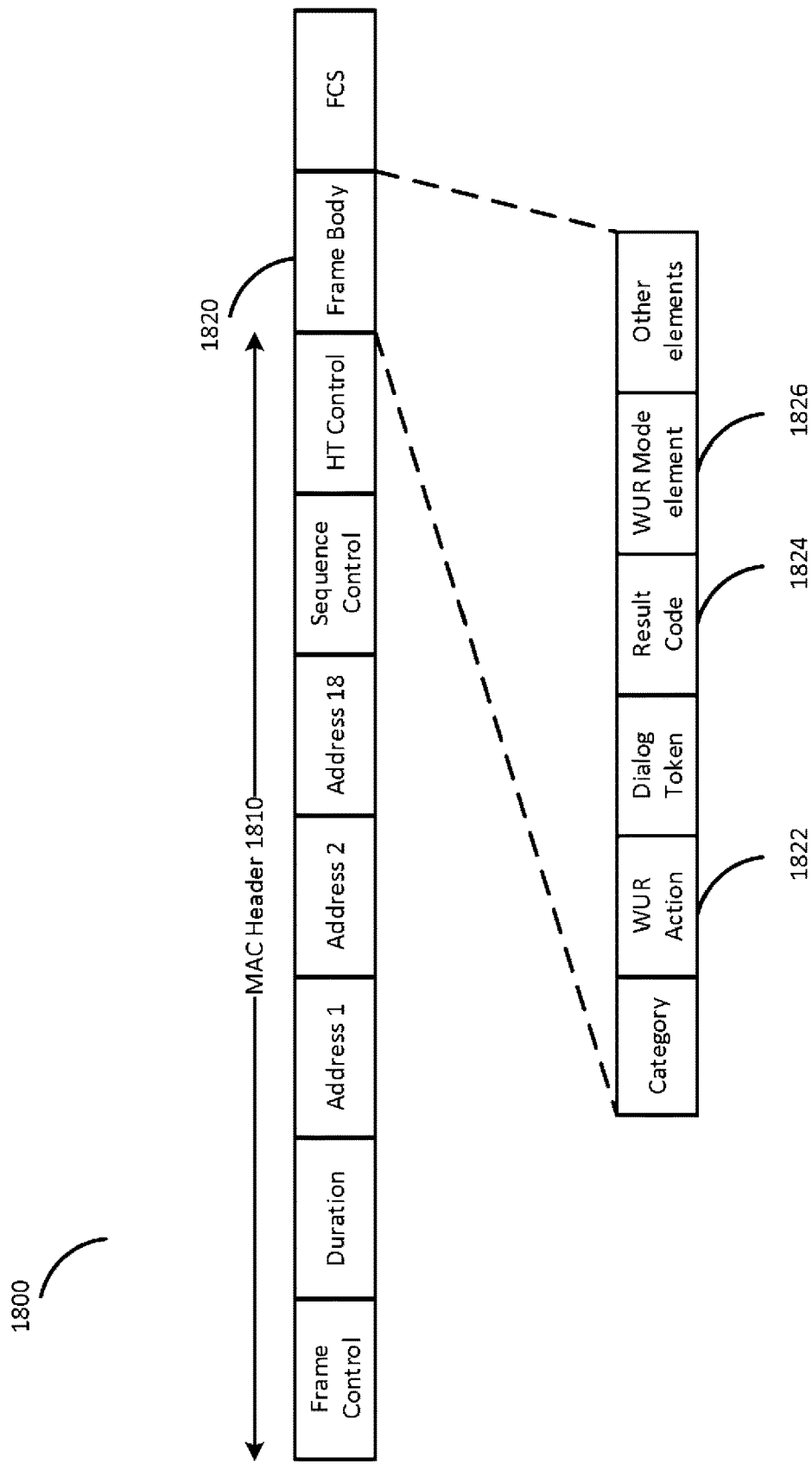

[Fig. 19A]
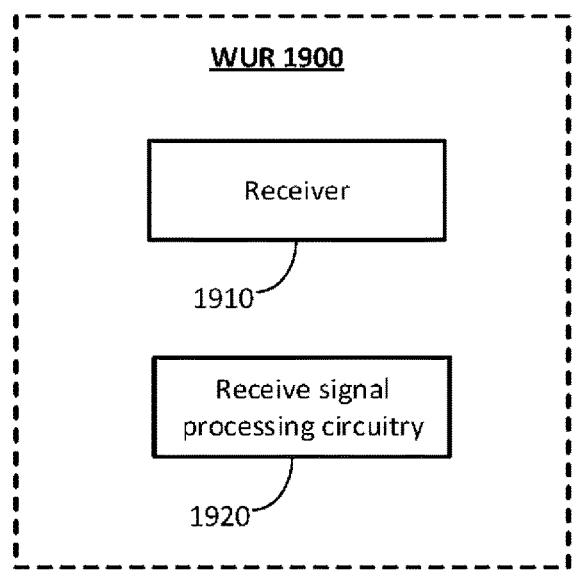
[Fig. 19B]
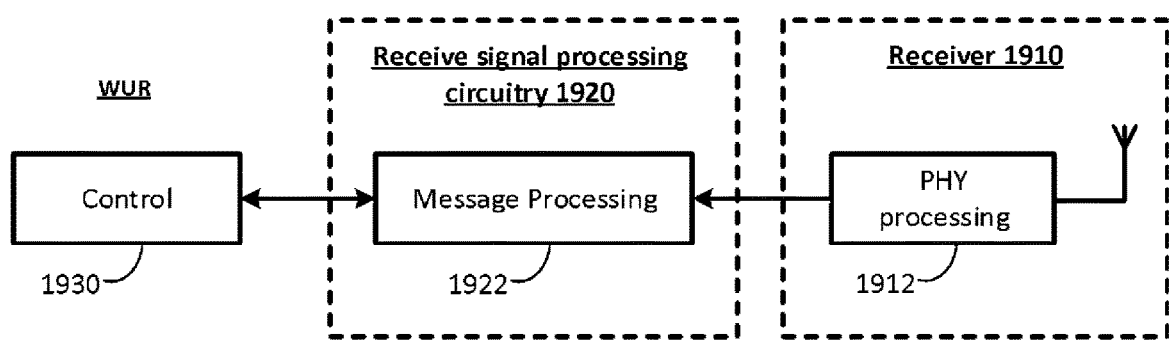

[Fig. 20A]
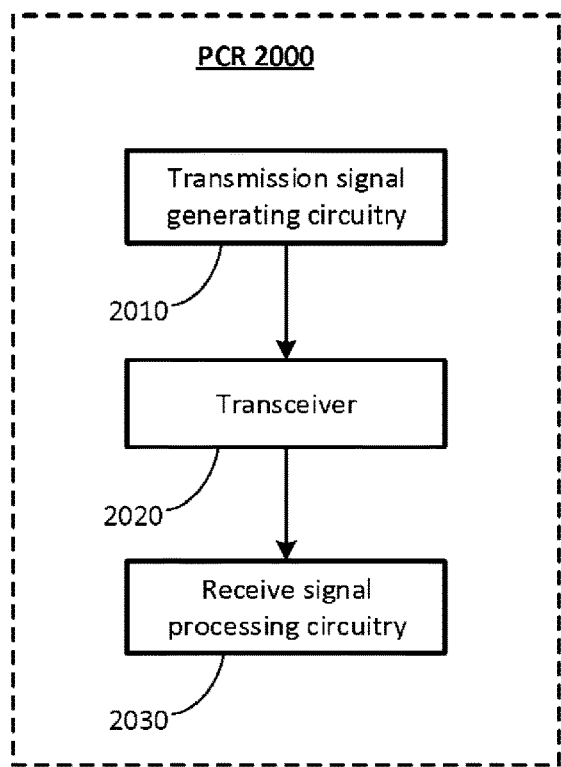
[Fig. 20B]
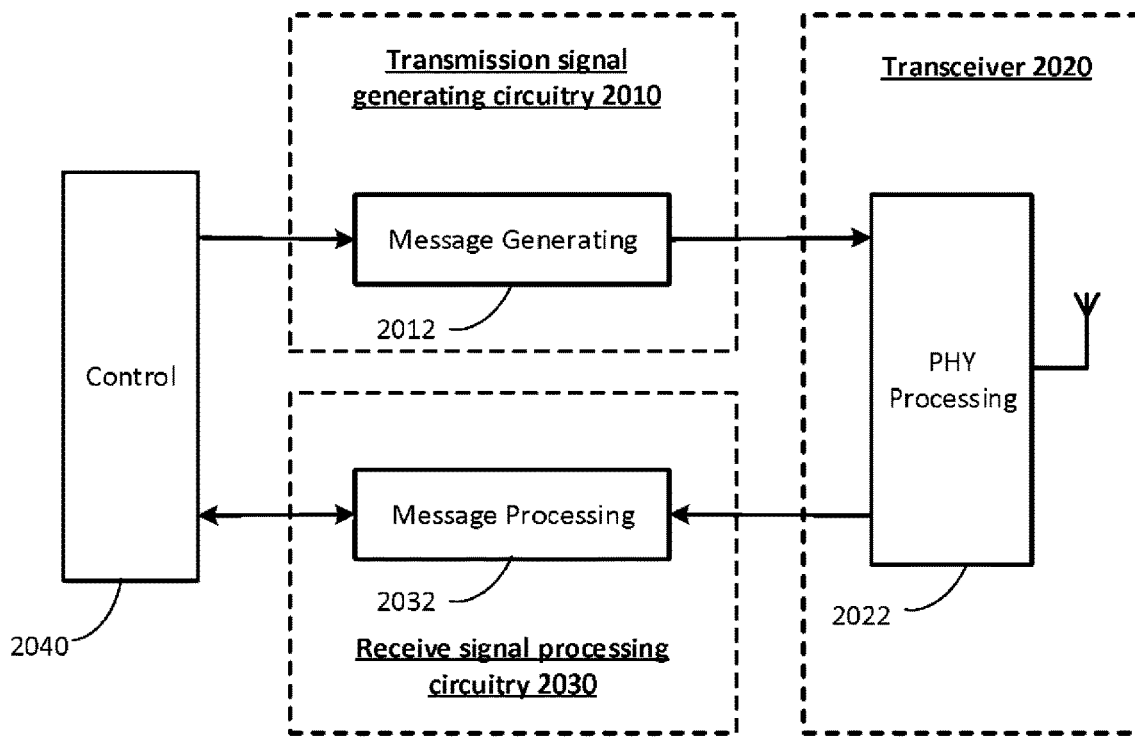

COMMUNICATION APPARATUS AND COMMUNICATION METHOD

CROSS-REFERENCE TO RELATED APPLICATIONS

This application is a U.S. national stage application of the PCT International Application No. PCT/JP2018/007684 filed on Mar. 1, 2018, which claims the benefit of provisional application 62/491,113 filed on Apr. 27, 2017 and which claims the benefit of foreign priority of Japanese patent application 2017-133118 filed on Jul. 6, 2017, the contents all of which are incorporated herein by reference.

TECHNICAL FIELD

The present disclosure is generally related to a communication apparatus and a communication method.

BACKGROUND ART

The IEEE (Institute of Electrical and Electronics Engineers) 802.11 Working Group is defining a physical (PHY) layer specification and modifications on medium access control (MAC) layer specification that enable operation of a wake-up radio (WUR) apparatus. The WUR apparatus is a companion radio apparatus to a primary connectivity radio (PCR) apparatus, e.g., IEEE 802.11a/b/g/n/ac/ax radio apparatus. The PCR apparatus included in a wireless communication device is used for user data transmission and reception; while the WUR apparatus included in the device is not used for user data transmission and reception. The wireless communication device can operate in either of the three power management modes: active mode, power save (PS) mode and WUR mode. When the wireless communication device is operating in the WUR mode, the PCR apparatus included in the device turns off; while the WUR apparatus included in the device turns on or periodically turns on or off. Once the WUR apparatus of the device receives a wake-up signal alerting that there is traffic for the PCR apparatus of the device to receive, the device transits to operate in active mode or PS mode.

CITATION LIST

Non Patent Literature

[NPL 1] IEEE 802.11-17/0379r0, SFD MAC proposal, March 2017
[NPL 2] IEEE 802.11-17/0342r4, WUR Negotiation and Acknowledgement Procedure Follow up, March 2017
[NPL 3] IEEE 802.11-17/0071r0, High Level MAC Concept for WUR, January 2017

SUMMARY OF INVENTION

Studies are underway on how a wireless communication device is able to change power management mode in an efficient manner.

One non-limiting and exemplary embodiment of the present disclosure facilitates changing power management mode in an efficient manner.

In one general aspect, the techniques disclosed here feature: a communication apparatus comprising a first receiver which, in operation, receives a downlink data frame from a base station; a decoder which, in operation, decodes data included in the received downlink data frame; a signal generator which, when the decoded data indicates that there is no buffered traffic for the communication apparatus, generates an uplink frame that includes acknowledgement information and a wake-up radio (WUR) mode request indicating a request to transit to the WUR mode from a primary connectivity radio (PCR) mode; and a transmitter which, in operation, transmits the uplink frame to the base station.

It should be noted that general or specific embodiments may be implemented as a system, a method, an integrated circuit, a computer program, a storage medium, or any selective combination thereof.

By taking advantage of the communication apparatus and the communication method described in the present disclosure, a wireless communication device is able to change power management mode in an efficient manner.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF DRAWINGS

FIG. 1 is a diagram illustrating an example wireless network.

FIG. 2A is a diagram illustrating power management mode change allowed for a STA according to a first aspect of the present disclosure.

FIG. 2B is a diagram illustrating power management mode change allowed for a STA according to a second aspect of the present disclosure.

FIG. 2C is a diagram illustrating power management mode change allowed for a STA according to a third aspect of the present disclosure.

FIG. 3A is a diagram illustrating example frame exchange for power management mode change according to a first embodiment of the present disclosure.

FIG. 3B is a flow chart illustrating an example error recovery procedure according to the first embodiment of the present disclosure.

FIG. 4 is a diagram illustrating example frame exchange for power management mode change according to a second embodiment of the present disclosure.

FIG. 5A is a diagram illustrating example frame exchange for power management mode change according to a third embodiment of the present disclosure.

FIG. 5B is a flow chart illustrating an example error recovery procedure according to the third embodiment of the present disclosure.

FIG. 6A is a diagram illustrating example frame exchange for power management mode change according to a fourth embodiment of the present disclosure.

FIG. 6B is a flow chart illustrating an example error recovery procedure according to the fourth embodiment of the present disclosure.

FIG. 7A is a diagram illustrating example frame exchange for power management mode change according to a fifth embodiment of the present disclosure.

FIG. 7B is a flow chart illustrating an example error recovery procedure according to the fifth embodiment of the present disclosure.

FIG. 8A is a diagram illustrating example frame exchange for power management mode change according to a sixth embodiment of the present disclosure.

FIG. 8B is a flow chart illustrating an example error recovery procedure according to the sixth embodiment of the present disclosure.

FIG. 8C is a flow chart illustrating an example error recovery procedure according to the sixth embodiment of the present disclosure.

FIG. 9A is a diagram illustrating example frame exchange for power management mode change according to a seventh embodiment of the present disclosure.

FIG. 9B is a flow chart illustrating an example error recovery procedure according to the seventh embodiment of the present disclosure.

FIG. 10A is a diagram illustrating example frame exchange for power management mode change according to an eighth embodiment of the present disclosure.

FIG. 10B is a flow chart illustrating an example error recovery procedure according to the eighth embodiment of the present disclosure.

FIG. 11A is a diagram illustrating example frame exchange for power management mode change according to a ninth embodiment of the present disclosure.

FIG. 11B is a flow chart illustrating an example error recovery procedure according to the ninth embodiment of the present disclosure.

FIG. 12A is a diagram illustrating example frame exchange for power management mode change according to a tenth embodiment of the present disclosure.

FIG. 12B is a flow chart illustrating an example error recovery procedure according to the tenth embodiment of the present disclosure.

FIG. 13A is a diagram illustrating example frame exchange for power management mode change according to an eleventh embodiment of the present disclosure.

FIG. 13B is a flow chart illustrating an example error recovery procedure according to the eleventh embodiment of the present disclosure.

FIG. 14 is a diagram illustrating an example format of ACK frame with a piggyback WUR mode request or response according to the present disclosure.

FIG. 15 is a diagram illustrating an example format of BlockAck frame with a piggyback WUR mode request or response according to the present disclosure.

FIG. 16 is a diagram illustrating an example format of Data frame with a piggybacked WUR mode request according to the present disclosure.

FIG. 17 is a diagram illustrating an example format of wake-up frame according to the present disclosure.

FIG. 18 is a diagram illustrating the example format of WUR Action frame according to the present disclosure.

FIG. 19A is a simple block diagram of an example WUR according to the present disclosure.

FIG. 19B is a detailed block diagram of an example WUR according to the present disclosure.

FIG. 20A is a simple block diagram of an example PCR according to the present disclosure.

FIG. 20B is a detailed block diagram of an example PCR according to the present disclosure.

DESCRIPTION OF EMBODIMENTS

The present disclosure can be better understood with the aid of following figures and embodiments. The embodiments described here are merely exemplary in nature and are used to describe some of the possible applications and uses of the present disclosure and should not be taken as limiting the present disclosure with regard to alternative embodiments that are not explicitly described herein.

In any wireless communication system, a wide variety of devices may be a part of the wireless network, each device differing in terms of traffic needs, device capabilities, power supply types and so on. Some class of devices may have less bandwidth requirements and also less stringent QoS requirements but may be relatively more concerned about power consumption (e.g., mobile phones). Another class of devices may have low bandwidth requirements as well as very low duty cycles but may be very sensitive to power consumption due to extremely small batteries or extremely long life expectancy (e.g., sensors for remote sensing).

In many wireless communication systems, there will be one or more central controllers which will determine the wireless network coverage area, the wireless frequency channels, the device admission policy, coordination with other neighboring wireless networks etc. and usually also act as a gateway to the backend infrastructure network. Examples of the central controllers are base stations or eNBs in cellular wireless networks or APs (Access Points) in WLANs (Wireless Local Area Networks).

Even though the techniques described in the present disclosure may apply to many wireless communication systems, for the sake of example, the rest of the descriptions in this disclosure are described in terms of an IEEE 802.11 based WLAN system and its associated terminologies. This should not be taken as limiting the present disclosure with regard to alternative wireless communication systems. In IEEE 802.11 based WLANs, majority of networks operate in infrastructure mode, i.e., all or most of the traffic in the network need to go through the AP. As such, any STA (station) wishing to join the WLAN must first negotiate the network membership with the AP through a process called association and authentication.

FIG. 1 illustrates an example wireless network 100 including an AP 110 and a plurality of STAs. The AP 110 includes a PCR apparatus (hereinafter stated simply as "PCR") 112. STA 130 represents a device class that may have less bandwidth requirements and also less stringent QoS requirements but may be relatively more concerned about power consumption. STA 140 represents another class of devices that may have low bandwidth requirements but may be very sensitive to power consumption. In order to maximise energy efficiency, the STA 130 is equipped with a WUR apparatus 134 (hereinafter stated simply as "WUR") in addition to a PCR 132 and the STA 140 is equipped with a WUR 144 in addition to a PCR 142. Both the STA 130 and the STA 140 are termed as WUR STAs thereafter.

After a STA (e.g., 130) performs the association procedure with the AP 110, the STA operates in either of the three power management modes: active mode, PS (power save) mode and WUR mode. Active mode and PS mode are termed as PCR modes thereafter. When the STA operates in PS mode, its PCR is in either awake state or doze state. In the PS mode, the STA's PCR is in awake state when its PCR is active and thus is able to receive DL (downlink) traffic or transmit UL (uplink) traffic. And the STA's PCR is in doze state when its PCR is not active and thus is not able to transmit UL traffic or receive DL traffic. When the STA operates in active mode, its PCR is always in awake state. When the STA operates in WUR mode, its PCR is always in doze state and its WUR can be always active or periodically active so that its WUR is able to receive a wake-up signal (e.g., unicast wake-up frame, multicast wake-up frame or WUR Beacon frame).

FIG. 2A illustrates power management mode change allowed for a STA in the network 100 according to a first aspect of the present disclosure. According to the first aspect of the present disclosure, the STA operating in active or PS mode can directly transit to operate in WUR mode in various ways.

In a first way of transitting to WUR mode, a WUR mode request is carried in a dedicated Management frame (e.g., WUR Mode Request frame) or piggybacked in a Control frame (e.g., acknowledgement frame) or Data frame addressed to the AP 110. After receiving a WUR mode response carried in a dedicated Management frame (e.g., WUR Mode Response frame) or piggybacked in a Control frame (e.g., acknowledgement frame) from the AP 110, the STA operating in active or PS mode may transit to operate in WUR mode.

In a second way of transitting to WUR mode, the change from active or PS mode to WUR mode at the STA is perceived by the AP 110 according to a determined rule without the help of WUR mode request or response. In a first example, if the STA operating in active or PS mode has not received DL traffic or transmitted UL traffic from/to the AP 110 for a first determined time period, it transits to operate in WUR mode. On the other hand, if the AP 110 has not transmitted DL traffic or received UL traffic to/from the STA operating in active or PS mode for a second determined time period, it deduces that the STA has transited to operate in WUR mode. The second determined time period may be longer than the first determined time period due to the time required by the STA operating in active or PS mode for transiting to operate in WUR mode.

In a second example, when the STA operating in active mode successfully receives an acknowledgement frame to an UL Data frame with the More Data field set to 0 (i.e., there is no more buffered UL traffic) addressed to the AP 110 or sends an acknowledgement frame to a DL Data frame with the More Data field set to 0 (i.e., there is no more buffered DL traffic for the STA) received from the AP 110, it transits to operate in WUR mode. On the other hand, when the AP 110 sends an acknowledgement frame which acknowledges successful receipt of an UL Data frame with the More Data field set to 0 transmitted by the STA operating in active mode, it deduces that the STA will transit to operate in WUR mode after receiving the acknowledgement frame. Similarly, when the AP 110 receives an acknowledgement frame which acknowledges successful receipt of a DL Data frame with the More Data field set to 0 addressed to the STA operating in active mode, it deduces that the STA will transit to operate in WUR mode after transmitting the acknowledgement frame.

Regarding the second example for the second way of transiting to WUR mode for the STA operating in PS mode, further details will be described herewith. If the STA operating in PS mode has transited from WUR mode prior to transiting back to WUR mode, when the STA operating in PS mode successfully receives an acknowledgement frame which acknowledges successful receipt of an UL Data frame with the More Data field set to 0 addressed to the AP 110, it transits to operate in WUR mode. Similarly, when the STA operating in PS mode sends an acknowledgement frame which acknowledges successful receipt of a DL Data frame with the More Data field set to 0 to the AP 110, it transits to operate in WUR mode. On the other hand, when the AP 110 sends an acknowledgement frame which acknowledges successful receipt of an UL Data frame with the More Data field set to 0 to the STA operating in PS mode, it deduces that the STA will transit to operate in WUR mode after receiving the acknowledgement frame. Similarly, when the AP 110 receives an acknowledgement frame which acknowledges successful receipt of a DL Data frame with the More Data field set to 0 from the STA operating in PS mode, it deduces that the STA will transit to operate in WUR mode after transmitting the acknowledgement frame.

If the STA operating in PS mode has not transited directly from WUR mode prior to transiting back to WUR mode, after receiving an acknowledgement frame from the AP 110 which acknowledges successful receipt of an UL Data frame with the More Data field set to 0 or transmitting an acknowledgement frame to the AP 110 which acknowledges successful receipt of a DL Data frame with the More Data field set to 0, the STA transits to doze state instead of transiting to WUR mode.

Between the above two ways of changing power management mode from active or PS mode to WUR mode by the STA according to the first aspect of the present disclosure, the first way can be used to negotiate new wake-up operating parameters via the dedicated Management frames. On the other hand, the second way does not incur any signaling overhead and thus can maximize channel efficiency.

According to the first aspect of the present disclosure, the STA operating in WUR mode can directly transit to operate in active or PS mode in various ways. In a first way of transiting from WUR mode to active or PS mode, after receiving a wake-up signal (e.g., unicast wake-up frame) from the AP 110 or when UL traffic is buffered, the STA operating in WUR mode can directly transit to operate in active or PS mode at its discretion. For one example, after receiving a wake-up signal (e.g., unicast wake-up frame) from the AP 110 or when UL traffic is buffered, the STA operating in WUR mode can transit to operate in active or PS mode depending on whether it operates in active or PS mode before operating in WUR mode. If the STA operates in active mode prior to operating in WUR mode, it transits back to operate in active mode. Otherwise, it transits back to operate in PS mode. For another example, when UL traffic is buffered, the STA operating in WUR mode can directly transit to operate in active or PS mode based on UL traffic load. If a large amount of UL traffic is buffered, the STA may transit from WUR mode to active mode to reduce delays or overhead that might be created by the operation in PS mode.

In a second way of transiting from WUR mode to active or PS mode, after receiving a wake-up signal (e.g., unicast wake-up frame) from the AP 110, the STA operating in WUR mode can directly transit to operate in active or PS mode according to a mode change instruction included in the received wake-up signal. For example, if the received wake-up signal indicates the change from WUR mode to active mode, the STA operating in WUR mode transits to operate in active mode. Otherwise, the STA operating in WUR mode transits to operate in PS mode. The AP 110 may select active or PS mode based on DL traffic load for the STA. If a large amount of DL traffic is buffered for the STA, the AP 110 may indicate the change from WUR mode to active mode in the wake-up signal to reduce delays or overhead that might be created by the operation in PS mode.

According to the first aspect of the present disclosure, even if the STA operating in WUR mode does not receive a wake-up signal or has no buffered UL traffic, it may transit to operate in active or PS mode from WUR mode. In this case, if the STA operating in WUR mode transits to operate in active mode, it shall transmit a Management frame or Data frame with the Power Management subfield set to 0 to the AP 110 for power management mode change notification. If the STA operating in WUR mode transits to operate in PS mode, it shall transmit a Management frame or Data frame with the Power Management subfield set to 1 to the AP 110 for power management mode change notification.

Between the above two ways of changing power management mode from WUR mode to active or PS mode by the STA according to the first aspect of the present disclosure, the first way does not require any mode change related signaling. The second way may reduce delays or overhead that might be created by the operation in PS mode when a large amount of DL traffic is buffered.

FIG. 2B illustrates power management mode change allowed for a STA (e.g., 130) in the network 100 according to a second aspect of the present disclosure. According to the second aspect of the present disclosure, the STA operating in active or PS mode can directly transit to operate in WUR mode in the same ways as the first aspect of the present disclosure. The STA operating in WUR mode cannot directly transit to operate in active mode; but can directly transit to operate in PS mode regardless of whether it operates in active or PS mode before operating in WUR mode, after receiving a wake-up signal (e.g., unicast wake-up frame) from the AP 110 or when UL traffic is buffered.

According to the second aspect of the present disclosure, since the STA operating in WUR mode cannot directly transit to active mode, the power management mechanism in the network 100 can be simplified.

FIG. 2C illustrates power management mode change allowed for a STA (e.g., 130) in the network 100 according to a third aspect of the present disclosure. According to the third aspect of the present disclosure, the STA operating in active mode cannot directly transit to operate in WUR mode and vice versa while the STA operating in PS mode can directly transit to operate in WUR mode and vice versa in the same ways as the second aspect of the present disclosure.

According to the third aspect of the present disclosure, since the STA operating in active mode cannot directly transit to operate in WUR mode and vice versa, the power management mechanism in the network 100 can be further simplified.

According to the first, second or third aspect of the present disclosure, how the STA changes power management mode between active mode and PS mode is specified in the IEEE 802.11-2016 standard.

First Embodiment

FIG. 3A illustrates example frame exchange for power management mode change between the AP 110 and a STA according to a first embodiment of the present disclosure. The first embodiment is compliant with the above-explained first aspect of the present disclosure. Namely, according to the first embodiment, the STA operating in active or PS mode can directly transit to operate in WUR mode and vice versa.

At the beginning of frame exchange, the STA is supposed to operate in PS mode. The STA sends a WUR Mode Request frame 302 to the AP 110 via its PCR for requesting to enter WUR mode for very low power operation. The WUR Mode Request frame 302 may contain information on wake-up operating parameters if the STA intends to negotiate new wake-up operating parameters, e.g., the time required for turning on the STA's PCR and the requested duty cycle (i.e., periodic on/off schedule) of the STA's WUR receiver. Upon receiving the WUR Mode Request frame 302, the AP 110 responds with a WUR Mode Response frame 304.

The WUR Mode Response frame 304 indicates whether the STA's request for entering WUR mode is accepted or rejected. The WUR Mode Response frame 304 may contain information on agreed wake-up operating parameters if the AP 110 intends to change wake-up operating parameters, e.g., WUR Beacon interval and agreed duty cycle of the STA's WUR receiver. Upon receiving the WUR Mode Response frame 304 from the AP 110, if the request for entering WUR mode is accepted, the STA transits to operate in WUR mode based on wake-up operating parameters most recently agreed by the AP 110 as illustrated in FIG. 3A. Otherwise, the STA's power management mode remains unchanged. In this case, the STA changes the power management mode from PS mode to WUR mode in the first way of transiting to WUR mode as mentioned above.

When DL traffic for the STA is buffered at the AP 110, the AP 110 will send a unicast wake-up frame 310 to the STA. Upon receiving the wake-up frame 310 via its WUR, the STA transits to operate in PS mode and stays in awake state since it operated in PS mode before operating in WUR mode. In other words, the STA transits to active or PS mode from WUR mode in the first way of transiting to WUR mode as mentioned above. Then, the STA transmits a PS-Poll frame 312 to the AP 110 via its PCR to retrieve buffered traffic and acknowledge successful receipt of the wake-up frame 310.

The AP 110 responds immediately to the PS-Poll frame 312 with a buffered Data frame 314 or an ACK frame followed in a separate TXOP (Transmission Opportunity) by a buffered Data frame at the head of transmit queue. If there is more buffered traffic for the STA, the More Data field in the delivered Data frame is set to 1. Otherwise, the More Data field in the delivered Data frame is set to 0. The STA responds with an acknowledgement frame 316 for acknowledging successful receipt of the Data frame 314. The acknowledgement frame is either an ACK frame or a BlockAck frame. After transmitting the acknowledgement frame 316 which acknowledges successful receipt of the Data frame 314 with the More Data field set to 0, the STA sends a WUR Mode Request frame 322 to the AP 110 for requesting to re-enter WUR mode. The WUR Mode Request frame 322 may contain information on wake-up operating parameters if the STA intends to negotiate new wake-up operating parameters. Upon receiving the WUR Mode Request frame 322 from the STA, the AP 110 responds with a WUR Mode Response frame 324. The WUR Mode Response frame 324 may contain information on agreed wake-up operating parameters if the AP 110 intends to change wake-up operating parameters.

Upon receiving the WUR Mode Response frame 324 from the AP 110, if the request for entering WUR mode is accepted, the STA transits back to operate in WUR mode based on wake-up operating parameters most recently agreed by the AP 110 as illustrated in FIG. 3A. Otherwise, the STA's power management mode remains unchanged. In this case of FIG. 3A, the STA changes the power management mode from PS mode to WUR mode in the first way of transiting to WUR mode as mentioned earlier.

According to the first embodiment of the present disclosure, it is possible for a STA to change its power management mode in an efficient manner.

FIG. 3B illustrates an error recovery procedure 300 performed by the STA according to the first embodiment of the present disclosure. According to the error recovery procedure 300, the STA shall maintain a counter called RetryCounter. The procedure 300 starts at step 330. At step 332, the STA initializes the value of RetryCounter to zero. At step 334, the STA determines whether a WUR Mode Response frame is received successfully within a determined timeout interval after transmitting a WUR Mode Request frame. If the WUR Mode Response frame is received successfully within the determined timeout interval after transmitting the WUR Mode Request frame, the STA transits to operate in WUR mode at step 344 and then the procedure 300 stops at step 350. Otherwise, the STA increments the value of RetryCounter by one at step 336.

At step 338, the STA ascertains whether the value of RetryCounter is less than the maximum number of permissible retransmissions of the WUR Mode Request frame. If the value of RetryCounter reaches the maximum number of permissible retransmissions, the procedure 300 stops at step 350. Otherwise, the STA retransmits the WUR Mode Request frame at step 340 and then the procedure 300 jumps back to step 334.

Second Embodiment

FIG. 4 illustrates example frame exchange for power management mode change between the AP 110 and a STA according to a second embodiment of the present disclosure. The second embodiment is compliant with the first aspect of the present disclosure. Namely, according to the second embodiment, the STA operating in active or PS mode can directly transit to operate in WUR mode and vice versa.

At the beginning of frame exchange, the STA is supposed to operate in active or PS mode. The STA sends a WUR Mode Request frame 402 to the AP 110 via its PCR for requesting to enter WUR mode for very low power operation. The WUR Mode Request frame 402 may contain information on wake-up operating parameters if the STA intends to negotiate new wake-up operating parameters, e.g., the time required for turning on the STA's PCR and the requested duty cycle of the STA's WUR receiver. Upon receiving the WUR Mode Request frame 402, the AP 110 responds with a WUR Mode Response frame 404. The WUR Mode Response frame 404 indicates whether the STA's request for entering WUR mode is accepted or rejected. The WUR Mode Response frame 404 may contain information on wake-up operating parameters if the AP 110 intends to change wake-up operating parameters, e.g., WUR Beacon interval and agreed duty cycle of the STA's WUR receiver.

Upon receiving the WUR Mode Response frame 404 from the AP 110, if the request for entering WUR mode is accepted, the STA transits to operate in WUR mode based on wake-up operating parameters most recently agreed by the AP 110 as illustrated in FIG. 4. Otherwise, the STA's power management mode remains unchanged. In this case, the STA changes the power management mode from active or PS mode to WUR mode in the first way of transitting to WUR mode as mentioned earlier.

When a large amount of UL traffic is buffered at the STA, the STA transits to operate in active mode. In other words, the STA changes the power management mode from WUR mode to active or PS mode in the first way of transitting from WUR mode to active or PS mode as mentioned above. The STA transmits a buffered Data frame 412 with the Power Management subfield set to 0 at the head of transmit queue. If there is more buffered traffic, the More Data field in the delivered Data frame is set to 1. Otherwise, the More Data field in the delivered Data frame is set to 0. The AP 110 responds with an acknowledgement frame 414 for successful receipt of the Data frame 412. The acknowledgement frame is either an ACK frame or a BlockAck frame.

Following reception of an acknowledgement frame 414 that acknowledges successful receipt of a Data frame 412 with the More Data field set to 0, the STA will send a WUR Mode Request frame 422 to the AP 110 for requesting to re-enter WUR mode. The WUR Mode Request frame 422 may contain information on wake-up operating parameters if the STA intends to negotiate new wake-up operating parameters. Upon receiving the WUR Mode Request frame 422 from the STA, the AP 110 responds with a WUR Mode Response frame 424. The WUR Mode Response frame 424 may contain information on agreed wake-up operating parameters if the AP 110 intends to change wake-up operating parameters. Upon receiving the WUR Mode Response frame 424 from the AP 110, if the request for entering WUR mode is accepted, the STA transits to operate in WUR mode based on wake-up operating parameters most recently agreed by the AP 110 as illustrated in FIG. 4A. Otherwise, the STA's power management mode remains unchanged. In this case, the STA changes the power management mode from active mode to WUR mode in the first way of transiting to WUR mode as mentioned above.

According to the second embodiment of the present disclosure, it is possible for a STA to change its power management mode in an efficient manner.

The second embodiment has the same error recovery procedure performed by the STA as the first embodiment of the present disclosure.

Third Embodiment

FIG. 5A illustrates example frame exchange for power management mode change between the AP 110 and a STA according to a third embodiment of the present disclosure. The third embodiment is compliant with the first aspect of the present disclosure. Namely, according to the third embodiment, the STA operating in active or PS mode can directly transit to operate in WUR mode and vice versa.

At the beginning of frame exchange, the STA is supposed to operate in active or PS mode. The STA sends a WUR Mode Request frame 502 to the AP 110 via its PCR for requesting to enter WUR mode for very low power operation. The WUR Mode Request frame 502 may contain information on wake-up operating parameters if the STA intends to negotiate new wake-up operating parameters, e.g., the time required for turning on the STA's PCR and the requested duty cycle of the STA's WUR receiver. Upon receiving the WUR Mode Request frame 502, the AP 110 responds with a WUR Mode Response frame 504. The WUR Mode Response frame 504 indicates whether the STA's request for entering WUR mode is accepted or rejected. The WUR Mode Response frame 504 may contain information on wake-up operating parameters if the AP 110 intends to change wake-up operating parameters, e.g., WUR Beacon interval and agreed duty cycle of the STA's WUR receiver.

Upon receiving the WUR Mode Response frame 504 from the AP 110, if the request for entering WUR mode is accepted, the STA transits to operate in WUR mode based on wake-up operating parameters most recently agreed by the AP 110 as illustrated in FIG. 5A. Otherwise, the STA's power management mode remains unchanged. In this case, the STA changes the power management mode from active or PS mode to WUR mode in the first way of transiting to WUR mode as mentioned earlier.

When DL traffic for the STA is buffered at the AP 110, the AP 110 will send a unicast wake-up frame 510 to the STA, which includes a mode change instruction from WUR mode to PS mode. Upon receiving the wake-up frame 510 via its WUR, the STA transits to operate in PS mode according to the mode change instruction in the received wake-up frame 510 and stays in the awake state. In other words, the STA changes the power management mode from WUR mode to active or PS mode in the second way of transiting from WUR mode to active or PS mode as mentioned above.

The STA transmits a PS-Poll frame 512 to the AP 110 via its PCR to retrieve buffered traffic and acknowledge successful receipt of the wake-up frame 510. The AP 110 responds immediately to the PS-Poll frame 512 with a buffered Data frame or an ACK frame followed in a separate TXOP by a buffered Data frame at the head of transmit queue. If there is more buffered traffic for the STA, the More Data field in the delivered Data frame is set to 1. Otherwise, the More Data field in the delivered Data frame is set to 0.

The STA responds with an acknowledgement frame for acknowledging successful receipt of the Data frame 514. The acknowledgement frame is either an ACK frame or a BlockAck frame. In particular, upon receiving a Data frame 514 with the More Data field set to 0, the STA sends an A-MPDU (aggregate MAC protocol data unit) which aggregates an acknowledgement frame 516 and a WUR Mode Request frame 522 to the AP 110 for acknowledging successful receipt of the Data frame 514 and requesting to re-enter WUR mode. The WUR Mode Request frame 522 in the A-MPDU may contain information on wake-up operating parameters if the STA intends to negotiate new wake-up operating parameters.

Upon receiving the A-MPDU aggregating the acknowledgement frame 516 and the WUR Mode Request frame 522 from the STA, the AP 110 responds with a WUR Mode Response frame 524. The WUR Mode Response frame 524 may contain information on agreed wake-up operating parameters if the AP 110 intends to change wake-up operating parameters. Upon receiving the WUR Mode Response frame 524 from the AP 110, if the request for entering WUR mode is accepted, the STA transits to operate in WUR mode based on wake-up operating parameters most recently agreed by the AP 110 as illustrated in FIG. 5A. Otherwise, the STA's power management mode remains unchanged. In this case, the STA changes the power management mode from PS mode to WUR mode in the first way of transitting from active or PS mode to WUR mode as mentioned above.

According to the third embodiment of the present disclosure, channel efficiency is improved compared with the first embodiment since the time required for transmitting a WUR Mode Request frame may be reduced.

FIG. 5B illustrates an error recovery procedure 500 performed by the STA according to the third embodiment of the present disclosure. According to the error recovery procedure 500, the STA shall maintain a counter called RetryCounter. The procedure 500 starts at step 530. At step 532, the STA initializes the value of RetryCounter to zero. At step 534, the STA determines whether a WUR Mode Response frame is received successfully within a determined timeout interval after transmitting an acknowledgement frame aggregated with a WUR Mode Request frame. If the WUR Mode Response frame is received successfully within the determined timeout interval after transmitting the acknowledgement frame aggregated with the WUR Mode Request frame, the STA transits to operate in WUR mode at step 544 and then the procedure 500 stops at step 550. Otherwise, the STA increments the value of RetryCounter by one at step 536.

At step 538, the STA ascertains whether the value of RetryCounter is less than the maximum number of permissible retransmissions of the WUR Mode Request frame. If the value of RetryCounter reaches the maximum number of permissible retransmissions, the procedure 500 stops at step 550. Otherwise, the STA retransmits the WUR Mode Request frame at step 540. At step 542, the STA checks whether a WUR Mode Response frame is received successfully within the determined timeout interval after retransmitting the WUR Mode Request frame. If the WUR Mode Response frame is received successfully within the determined timeout interval after retransmitting the WUR Mode Request frame, the STA transits to operate in WUR mode at step 544 and then the procedure 500 stops at step 550. Otherwise, the procedure 500 jumps back to step 536.

Fourth Embodiment

FIG. 6A illustrates example frame exchange for power management mode change between the AP 110 and a STA according to a fourth embodiment of the present disclosure. The fourth embodiment is compliant with the third aspect of the present disclosure. Namely, according to the fourth embodiment, the STA operating in active mode cannot directly transit to operate in WUR mode and vice versa.

At the beginning of frame exchange, the STA is supposed to operate in PS mode. The STA sends a WUR Mode Request frame 602 to the AP 110 via its PCR for requesting to enter WUR mode for very low power operation. The WUR Mode Request frame 602 may contain information on wake-up operating parameters if the STA intends to negotiate new wake-up operating parameters, e.g., the time required for turning on the STA's PCR and the requested duty cycle of the STA's WUR receiver. Upon receiving the WUR Mode Request frame 602, the AP 110 responds with a WUR Mode Response frame 604. The WUR Mode Response frame 604 indicates whether the STA's request for entering WUR mode is accepted or rejected. The WUR Mode Response frame 604 may contain information on agreed wake-up operating parameters if the AP 110 intends to change wake-up operating parameters, e.g., WUR Beacon interval and agreed duty cycle of the STA's WUR receiver.

Upon receiving the WUR Mode Response frame 604 from the AP 110, if the request for entering WUR mode is accepted, the STA transits to operate in WUR mode based on wake-up operating parameters most recently agreed by the AP 110 as illustrated in FIG. 6A. Otherwise, the STA's power management mode remains unchanged. In this case, the STA changes the power management mode from PS mode to WUR mode in the first way of transiting to WUR mode as mentioned earlier.

When DL traffic for the STA is buffered at the AP 110, the AP 110 will send a unicast wake-up frame 610 to the STA. Upon receiving the wake-up frame 610 via its WUR, the STA transits to operate in PS mode since it cannot directly transit to operate in active mode and stays in awake state.

The STA transmits a PS-Poll frame 612 to the AP 110 via its PCR to retrieve buffered traffic and acknowledge successful receipt of the wake-up frame 610. The AP 110 responds immediately to the PS-Poll frame 612 with a buffered Data frame or an ACK frame followed in a separate TXOP by a buffered Data frame at the head of transmit queue. If there is more buffered traffic, the More Data field in the delivered Data frame is set to to 1. Otherwise, the More Data field in the delivered Data frame is set to to 0.

The STA responds with an acknowledgement frame 616 for acknowledging successful receipt of the Data frame 614. The acknowledgement frame is either an ACK frame or a BlockAck frame. In particular, upon receiving a Data frame 614 with the More Data field set to 0, the STA sends an acknowledgement frame 616 with a piggybacked WUR mode request as illustrated in FIG. 14 or FIG. 15 to the AP 110 for acknowledging successful receipt of the Data frame 614 and requesting to re-enter WUR mode. As will be explained later, WUR mode request is embedded in a field or subfield of the acknowledgement frame 616. In this case, the STA cannot negotiate new wake-up operating parameters.

Upon receiving the acknowledgement frame 616 with a piggybacked WUR mode request from the STA, the AP 110 responds with a WUR Mode Response frame 624. The WUR Mode Response frame 624 may contain information on agreed wake-up operating parameters if the AP 110 intends to change wake-up operating parameters. Upon receiving the WUR Mode Response frame 624 from the AP 110, if the request for entering WUR mode is accepted, the STA transits to operate in WUR mode based on wake-up operating parameters most recently agreed by the AP 110 as illustrated in FIG. 6A. Otherwise, the STA's power management mode remains unchanged. In this case, the STA changes the power management mode from PS mode to WUR mode in the first way of transiting to WUR mode as mentioned earlier.

According to the fourth embodiment of the present disclosure, channel efficiency is improved compared with the first embodiment since transmission of a WUR Mode Request frame may not be required for entering WUR mode.

FIG. 6B illustrates an error recovery procedure 600 performed by the STA according to the fourth embodiment of the present disclosure. According to the error recovery procedure 600, the STA shall maintain a counter called RetryCounter. The procedure 600 starts at step 630. At step 632, the STA initializes the value of RetryCounter to zero. At step 634, the STA determines whether a WUR Mode Response frame is received successfully within a determined timeout interval after transmitting an acknowledgement frame with a piggybacked WUR mode request. If the WUR Mode Response frame is received successfully within the determined timeout interval after transmitting the acknowledgement frame with a piggybacked WUR mode request, the STA transits to operate in WUR mode at step 644 and then the procedure 600 stops at step 650. Otherwise, the STA increments the value of RetryCounter by one at step 636.

At step 638, the STA ascertains whether the value of RetryCounter is less than the maximum number of permissible retransmissions of the acknowledgement frame with a piggybacked WUR mode request. If the value of Retry-Counter reaches the maximum number of permissible retransmissions, the procedure 600 stops at step 650. Otherwise, the STA retransmits the acknowledgement frame with a piggybacked WUR mode request at step 640 and then the procedure 600 jumps back to step 634.

Fifth Embodiment

FIG. 7A illustrates example frame exchange for power management mode change between the AP 110 and a STA according to a fifth embodiment of the present disclosure. The fifth embodiment is compliant with the second aspect of the present disclosure. Namely, according to the fifth embodiment, the STA operating in WUR mode cannot directly transit to operate in active mode.

At the beginning of frame exchange, the STA is supposed to operate in active or PS mode. The STA sends a WUR Mode Request frame 702 to the AP 110 via its PCR for requesting to enter WUR mode for very low power operation. The WUR Mode Request frame 702 may contain information on wake-up operating parameters if the STA intends to negotiate new wake-up operating parameters, e.g., the time required for turning on the STA's PCR and the requested duty cycle of the STA's WUR receiver. Upon receiving the WUR Mode Request frame 702, the AP 110 responds with a WUR Mode Response frame 704. The WUR Mode Response frame 704 indicates whether the STA's request for entering WUR mode is accepted or rejected. The WUR Mode Response frame 704 may contain information on wake-up operating parameters if the AP 110 intends to change wake-up operating parameters, e.g., WUR Beacon interval and agreed duty cycle of the STA's WUR receiver.

Upon receiving the WUR Mode Response frame 704 from the AP 110, if the request for entering WUR mode is accepted, the STA transits to operate in WUR mode based on wake-up operating parameters most recently agreed by the AP 110 as illustrated in FIG. 7A. Otherwise, the STA's power management mode remains unchanged. In this case, the STA changes the power management mode from active or PS mode to WUR mode in the first way of transiting to WUR mode as mentioned earlier.

When DL traffic for the STA is buffered, the AP 110 will send a unicast wake-up frame 710 to the STA. The wake-up frame 710 indicates whether the AP 110 responds with a WUR mode response after receiving a WUR mode request. Upon receiving the wake-up frame 710 via its WUR, the STA transits to operate in PS mode since it cannot directly transit to operate in active mode from WUR mode and stays in awake state.

The STA transmits a PS-Poll frame 712 to the AP 110 via its PCR to retrieve buffered traffic and acknowledge successful receipt of the wake-up frame 710. The AP 110 responds immediately to the PS-Poll frame 712 with a buffered Data frame 714 or an ACK frame followed in a separate TXOP by a buffered Data frame at the head of transmit queue. If there is more buffered traffic, the More Data field in the delivered Data frame is set to 1. Otherwise, the More Data field in the Data frame is set to 0.

The STA responds with an acknowledgement frame 716 for acknowledging successful receipt of the Data frame 714. The acknowledgement frame is either an ACK frame or a BlockAck frame. Upon receiving a Data frame 714 with the More Data field set to 0, the STA transmits an acknowledgement frame 716 with a piggybacked WUR mode request to the AP 110 for acknowledging successful receipt of the Data frame 714 and requesting to re-enter WUR mode. The WUR mode request is embedded in a field or subfield of the acknowledgement frame 716 as illustrated in FIG. 14 or FIG. 15, which will be explained in detail later. In this case, the STA cannot negotiate new wake-up operating parameters.

If the received wake-up frame 710 indicates that the AP 110 does not respond with a WUR mode response after receiving a WUR mode request, the STA transits to operate in WUR mode based on wake-up operating parameters most recently agreed by the AP 110 after transmitting the acknowledgement frame 716 with a piggybacked WUR mode request as illustrated in FIG. 7A. In other words, the STA transits to operate in WUR mode without waiting to receive a WUR mode response from the AP 110. Otherwise, the STA transits to operate in WUR mode after receiving a WUR Mode Response frame as illustrated in FIG. 6A. In this case, the STA changes the power management mode from PS mode to WUR mode in the first way of transiting to WUR mode as mentioned earlier.

According to the fifth embodiment of the present disclosure, channel efficiency is improved compared with the first embodiment since transmission of a WUR Mode Request frame and a WUR Mode Response frame may not be required for entering WUR mode.

FIG. 7B illustrates an error recovery procedure 700 performed by the AP 110 according to the fifth embodiment of the present disclosure. According to the error recovery procedure 700, the AP 110 shall maintain a counter called RetryCounter. The procedure 700 starts at step 730. At step 732, the AP 110 initializes the value of RetryCounter to zero. At step 734, the the AP 110 determines whether an acknowledgement frame with a piggybacked WUR mode request is received successfully within a determined timeout interval after transmitting a Data frame with the More Data field set to 0. If the acknowledgement frame with a piggybacked WUR mode request is received successfully within the determined timeout interval after transmitting the Data frame with the More Data field set to 0, the AP 110 supposes the STA has transited to operate in WUR mode at step 744 and then the procedure 700 stops at step 750. Otherwise, the AP 110 increments the value of RetryCounter by one at step 736.

At step 738, the AP 110 ascertains whether the value of RetryCounter is less than the maximum number of permissible retransmissions of the the Data frame with the More Data field set to 0. If the value of RetryCounter reaches the maximum number of permissible retransmissions, the procedure 700 proceeds to step 744. Otherwise, the AP 110 retransmits the Data frame with the More Data field set to 0 at step 740 and then the procedure 700 jumps back to step 734.

Sixth Embodiment

FIG. 8A illustrates example frame exchange for power management mode change between the AP 110 and a STA according to a sixth embodiment of the present disclosure. The sixth embodiment is compliant with the second aspect of the present disclosure. Namely, according to the sixth embodiment, the STA operating in WUR mode cannot directly transit to operate in active mode.

At the beginning of frame exchange, the STA is supposed to operate in active or PS mode. The STA sends a WUR Mode Request frame 802 to the AP 110 via its PCR for requesting to enter WUR mode for very low power operation. The WUR Mode Request frame 802 may contain information on wake-up operating parameters if the STA intends to negotiate new wake-up operating parameters, e.g., the time required for turning on the STA's PCR and the requested duty cycle of the STA's WUR receiver. Upon receiving the WUR Mode Request frame 802, the AP 110 responds with a WUR Mode Response frame 804. The WUR Mode Response frame 804 indicates whether the STA's request for entering WUR mode is accepted or rejected. The WUR Mode Response frame 804 may contain information on agreed wake-up operating parameters if the AP 110 intends to change wake-up operating parameters, e.g., WUR Beacon interval and agreed duty cycle of the STA's WUR receiver.

Upon receiving the WUR Mode Response frame 804 from the AP 110, if the request for entering WUR mode is accepted, the STA transits to operate in WUR mode based on wake-up operating parameters most recently agreed by the AP 110 as illustrated in FIG. 8A. Otherwise, the STA's power management mode remains unchanged. In this case, the STA changes the power management mode from active or PS mode to WUR mode in the first way of transiting to WUR mode as mentioned earlier.

When UL traffic is buffered at the STA, the STA transits to operate in PS mode since it cannot directly transit to operate in active mode from WUR mode and stays in awake state. The STA transmits a buffered Data frame with the Power Management subfield set to 1 at the head of transmit queue. If there is more buffered traffic, the More Data field in the Data frame is set to 1. Otherwise, the More Data field in the Data frame is set to 0. The AP 110 responds with an acknowledgement frame for acknowledging successful receipt of the Data frame. The acknowledgement frame is either an ACK frame or a BlockAck frame.

In particular, the STA transmits an A-MPDU that aggregates a Data frame 812 with the More Data field set to 0 and a WUR Mode Request frame 822 to the AP 110 for requesting to re-enter WUR mode. The WUR Mode Request frame 822 may contain information on wake-up operating parameters if the STA intends to negotiate new wake-up operating parameters.

Upon receiving the Data frame 812 with the More Data field set to 0 aggregated with the WUR Mode Request frame 822 from the STA, the AP 110 responds with another A-MPDU that aggregates an acknowledgement frame 814 and a WUR Mode Response frame 824. The WUR Mode Response frame 814 may contain information on agreed wake-up operating parameters if the AP 110 intends to change wake-up operating parameters.

Upon receiving the acknowledgement frame 814 aggregated with the WUR Mode Response frame 824 from the AP 110, if the request for entering WUR mode is accepted, the STA transits to operate in WUR mode based on wake-up operating parameters most recently agreed by the AP 110 as illustrated in FIG. 8A. Otherwise, the STA's power management mode remains unchanged. In this case, the STA changes the power management mode from PS mode to WUR mode in the first way of transiting to WUR mode as mentioned earlier.

According to the sixth embodiment of the present disclosure, channel efficiency is improved compared with the second embodiment since the time required for transmission of a WUR Mode Request frame and a WUR Mode Response frame is reduced.

FIGS. 8B and 8C illustrate an error recovery procedure 800 performed by the STA according to the sixth embodiment of the present disclosure. According to the error recovery procedure 800, the STA shall maintain a counter called RetryCounter. The procedure 800 starts at step 830. At step 832, the STA initializes the value of RetryCounter to zero.

At step 834, the STA determines whether both an acknowledgement frame and a WUR Mode Response frame are received successfully within a determined timeout interval after transmitting a Data frame with the More Data field set to 0 aggregated with a WUR Mode Request frame. If both the acknowledgement frame and the WUR Mode Response frame are received successfully within the determined timeout interval after transmitting the Data frame with the More Data field set to 0 aggregated with the WUR Mode Request frame, the STA transits to operate in WUR mode at step 848 and then the procedure 800 stops at step 860. Otherwise, the procedure 800 proceeds to step 836.

At step 836, the STA ascertains whether the acknowledgement frame is received successfully and the WUR Mode Response frame is not received successfully within the determined timeout interval after transmitting the Data frame with the More Data field set to 0 aggregated with the WUR Mode Request frame. If the acknowledgement frame is received successfully and the WUR Mode Response frame is not received successfully within the determined timeout interval after transmitting the Data frame with the More Data field set to 0 aggregated with the WUR Mode Request frame, the STA increments the value of RetryCounter by one at step 838. Otherwise, the procedure 800 proceeds to step 850.

At step 840, the STA ascertains whether the value of RetryCounter is less than the maximum number of permissible retransmissions of the WUR Mode Request frame. If the value of RetryCounter reaches the maximum number of permissible retransmissions, the procedure 800 stops at step 860. Otherwise, the STA retransmits the WUR Mode Request frame at step 842. At step 844, the STA checks whether a WUR Mode Response frame is received successfully within the determined timeout interval after retransmitting the WUR Mode Request frame. If the WUR Mode Response frame is received successfully within the determined timeout interval after retransmitting the WUR Mode Request frame, the procedure 800 proceeds to step 848. Otherwise, the procedure 800 jumps back to step 838.

At step 850, the STA increments the value of RetryCounter by one. At step 852, the STA ascertains whether the value of RetryCounter is less than the maximum number of permissible retransmissions of the Data frame aggregated with the WUR Mode Request frame. If the value of RetryCounter reaches the maximum number of permissible retransmissions, the procedure 800 stops at step 860. Otherwise the STA retransmits the Data frame with the More Data field set to 0 aggregated with the WUR Mode Request frame at step 854 and then the procedure 800 proceeds to step 834.

Seventh Embodiment

FIG. 9A illustrates example frame exchange for power management mode change between the AP 110 and a STA according to a seventh embodiment of the present disclosure. The seventh embodiment is compliant with the second aspect of the present disclosure. Namely, according to the seventh embodiment, the STA operating in WUR mode cannot directly transit to operate in active mode.

At the beginning of frame exchange, the STA is supposed to operate in active or PS mode. The STA sends a WUR Mode Request frame 902 to the AP 110 via its PCR for requesting to enter WUR mode for very low power operation. The WUR Mode Request frame 902 may contain information on wake-up operating parameters if the STA intends to negotiate new wake-up operating parameters, e.g., the time required for turning on the STA's PCR and the requested duty cycle of the STA's WUR receiver. Upon receiving the WUR Mode Request frame 902, the AP 110 responds with a WUR Mode Response frame 904. The WUR Mode Response frame 904 indicates whether the STA's request for entering WUR mode is accepted or rejected. The WUR Mode Response frame 904 may contain information on agreed wake-up operating parameters if the AP 110 intends to change wake-up operating parameters, e.g., WUR Beacon interval and agreed duty cycle of the STA's WUR receiver.

Upon receiving the WUR Mode Response frame 904 from the AP 110, if the request for entering WUR mode is accepted, the STA transits to operate in WUR mode based on wake-up operating parameters most recently agreed by the AP 110 as illustrated in FIG. 9A. Otherwise, the STA's power management mode remains unchanged. In this case, the STA changes the power management mode from active or PS mode to WUR mode in the first way of transiting to WUR mode as mentioned earlier.

When UL traffic is buffered at the STA, the STA transits to operate in PS mode since it cannot directly transit to operate in active mode from WUR mode and stays in awake state. The STA transmits a buffered Data frame with the Power Management subfield set to 1 at the head of transmit queue. If there is more buffered traffic, the More Data field in the Data frame is set to 1. Otherwise, the More Data field in the Data frame is set to 0. The AP 110 responds with an acknowledgement frame for acknowledging successful receipt of the Data frame. The acknowledgement frame is either an ACK frame or a BlockAck frame.

In particular, the STA transmits an A-MPDU that aggregates the Data frame 912 with the More Data field set to 0 and a WUR Mode Request frame 922 to the AP 110 for requesting to re-enter WUR mode. The WUR Mode Request frame 922 may contain information on wake-up operating parameters if the STA intends to negotiate new wake-up operating parameters.

Upon receiving the Data frame 912 with the More Data field set to 0 aggregated with the WUR Mode Request frame 922 from the STA, the AP 110 responds with an acknowledgement frame 914 with a piggybacked WUR mode response. The WUR mode response is embedded in a field or subfield of the acknowledgement frame 914 as illustrated in FIG. 14 or FIG. 15, which will be explained in detail later. In this case, the AP 110 cannot change wake-up operating parameters.

Upon receiving the acknowledgement frame 914 with the piggybacked WUR mode response from the AP 110, the STA transits to operate in WUR mode based on wake-up operating parameters most recently agreed by the AP 110 as illustrated in FIG. 9A. In this case, the STA changes the power management mode from PS mode to WUR mode in the first way of transiting to WUR mode as mentioned earlier.

According to the seventh embodiment of the present disclosure, channel efficiency is improved compared with the second embodiment since the time required for transmission of a WUR Mode Request frame may be reduced and transmission of a WUR Mode Response frame may not be required.

FIG. 9B illustrates an error recovery procedure 900 performed by the STA according to the seventh embodiment of the present disclosure. According to the error recovery procedure 900, the STA shall maintain a counter called RetryCounter. The procedure 900 starts at step 930. At step 932, the STA initializes the value of RetryCounter to zero.

At step 934, the STA determines whether an acknowledgement frame with a piggybacked WUR mode response is received successfully within a determined timeout interval after transmitting a Data frame with the More Data field set to 0 aggregated with a WUR Mode Request frame. If the acknowledgement frame with a piggybacked WUR mode response is received successfully within the determined timeout interval after transmitting the Data frame with the More Data field set to 0 aggregated with the WUR Mode Request frame, the STA transits to operate in WUR mode at step 944 and then the procedure 900 stops at step 950. Otherwise, the STA increments the value of RetryCounter by one at step 936.

At step 938, the STA ascertains whether the value of RetryCounter is less than the maximum number of permissible retransmissions of the Data frame with the More Data field set to 0 aggregated with the WUR Mode Request frame. If the value of RetryCounter reaches the maximum number of permissible retransmissions, the procedure 900 stops at step 950. Otherwise, the STA retransmits the Data frame with the More Data field set to 0 aggregated with the WUR Mode Request frame at step 940 and then the procedure 900 proceeds to step 934.

Eighth Embodiment

FIG. 10A illustrates example frame exchange for power management mode change between the AP 110 and a STA according to an eighth embodiment of the present disclosure. The eighth embodiment is compliant with the third aspect of the present disclosure. Namely, according to the eighth embodiment, the STA operating in WUR mode cannot directly transit to operate in active mode and vice versa.

At the beginning of frame exchange, the STA is supposed to operate in PS mode. The STA sends a WUR Mode Request frame 1002 to the AP 110 via its PCR for requesting to enter WUR mode for very low power operation. The WUR Mode Request frame 1002 may contain information on wake-up operating parameters if the STA intends to negotiate new wake-up operating parameters, e.g., the time required for turning on the STA's PCR and the requested duty cycle of the STA's WUR receiver.

Upon receiving the WUR Mode Request frame 1002, the AP 110 responds with a WUR Mode Response frame 1004. The WUR Mode Response frame 1004 indicates whether the STA's request for entering WUR mode is accepted or rejected. The WUR Mode Response frame 1004 may contain information on agreed wake-up operating parameters if the AP 110 intends to change wake-up operating parameters, e.g., WUR Beacon interval and agreed duty cycle of the STA's WUR receiver. Upon receiving the WUR Mode Response frame 1004 from the AP 110, if the request for entering WUR mode is accepted, the STA transits to operate in WUR mode based on wake-up operating parameters most recently agreed by the AP 110 as illustrated in FIG. 10A. Otherwise, the STA's power management mode remains unchanged. In this case, the STA changes the power management mode from PS mode to WUR mode in the first way of transiting to WUR mode as mentioned earlier.

When UL traffic is buffered at the STA, the STA transits to operate in PS mode since it cannot directly transit to operate in active mode from WUR mode and stays in awake state. The STA transmits a buffered Data frame with the Power Management subfield set to 1 at the head of transmit queue. If there is more buffered traffic, the More Data field in the Data frame is set to 1. Otherwise, the More Data field in the Data frame is set to 0. The AP 110 responds with an acknowledgement frame for acknowledging successful receipt of the Data frame. The acknowledgement frame is either an ACK frame or a BlockAck frame.

In particular, the STA transmits a Data frame 1012 with the More Data field set to 0 and with a piggybacked WUR mode request to the AP 110 for requesting to re-enter WUR mode. The WUR mode request is embedded in a field or subfield of the Data frame 1012 as illustrated in FIG. 16. In this case, the STA cannot negotiate new wake-up operating parameters.

Upon receiving the Data frame 1012 with the More Data field set to 0 and a piggybacked WUR mode request from the STA, the AP 110 responds with an A-MPDU that aggregates an acknowledgement frame 1014 and a WUR Mode Response frame 1024. The WUR Mode Response frame 1024 may contain agreed wake-up operating parameters if the AP 110 intends to change wake-up operating parameters. Upon receiving the acknowledgement frame 1014 aggregated with the WUR Mode Response frame 1024 from the AP 110, if the request for entering WUR mode is accepted, the STA transits to operate in WUR mode based on wake-up operating parameters most recently agreed by the AP 110 as illustrated in FIG. 10A. Otherwise, the STA's power management mode remains unchanged. In this case, the STA changes the power management mode from PS mode to WUR mode in the first way of transiting to WUR mode as mentioned earlier.

According to the eighth embodiment of the present disclosure, channel efficiency is improved compared with the second embodiment since the time required for transmission of a WUR Mode Response frame may be reduced and transmission of a WUR Mode Request frame may not be required.

FIG. 10B illustrates an error recovery procedure 1000 performed by the STA according to the eighth embodiment of the present disclosure. According to the error recovery procedure 1000, the STA shall maintain a counter called RetryCounter. The procedure 1000 starts at step 1030. At step 1032, the STA initializes the value of RetryCounter to zero.

At step 1034, the STA determines whether both an acknowledgement frame and a WUR Mode Response frame are received successfully within a determined timeout interval after transmitting a Data frame with the More Data field set to 0 and with a piggybacked WUR mode request. If both the acknowledgement frame and the WUR Mode Response frame are received successfully within the determined timeout interval after transmitting the Data frame with the More Data field set to 0 and with a piggybacked WUR mode request, the STA transits to operate in WUR mode at step 1048 and then the procedure 1000 stops at step 1060. Otherwise, the STA ascertains whether the acknowledgement frame is received successfully and the WUR Mode Response frame is not received successfully within the determined timeout interval after transmitting the Data frame with the More Data field set to 0 and with a piggybacked WUR mode request at step 1036. If the acknowledgement frame is received successfully and the WUR Mode Response frame is not received successfully within the determined timeout interval after transmitting the Data frame with the More Data field set to 0 and with a piggybacked WUR mode request, the STA increments the value of RetryCounter by one at step 1038. Otherwise, the procedure 1000 proceeds to step 1050.

At step 1040, the STA checks whether the value of RetryCounter is less than the maximum number of permissible retransmissions of the WUR Mode Request frame. If the value of RetryCounter reaches the maximum number of permissible retransmissions, the procedure 1000 stops at step 1060. Otherwise, the STA transmits a WUR Mode Request frame at step 1042.

At step 1044, the STA checks whether a WUR Mode Response frame is received successfully within the determined timeout interval after transmitting the WUR Mode Request frame. If a WUR Mode Response frame is received successfully within the determined timeout interval after transmitting the WUR Mode Request frame, the procedure 1000 proceeds to step 1048. Otherwise the procedure 1000 jumps back to step 1038.

At step 1050, the STA increments the value of RetryCounter by one. At step 1052, the STA checks whether the value of RetryCounter is less than the maximum number of permissible retransmissions of the Data frame with the More Data field set to 0 and with a piggybacked WUR mode request. If the value of RetryCounter reaches the maximum number of permissible retransmissions, the procedure 1000 stops at step 1060. Otherwise the STA retransmits the Data frame with the More Data field set to 0 and with a piggybacked WUR mode request at step 1054 and then the procedure 1000 proceeds to step 1034.

Ninth Embodiment

FIG. 11A illustrates example frame exchange for power management mode change between the AP 110 and a STA according to a ninth embodiment of the present disclosure. The ninth embodiment is compliant with the third aspect of the present disclosure. Namely, according to the ninth embodiment, the STA operating in WUR mode cannot directly transit to operate in active mode and vice versa.

At the beginning of frame exchange, the STA is supposed to operate in PS mode. The STA sends a WUR Mode Request frame 1102 to the AP 110 via its PCR for requesting to enter WUR mode for very low power operation. The WUR Mode Request frame 1102 may contain information on wake-up operating parameters if the STA intends to negotiate new wake-up operating parameters, e.g., the time required for turning on the STA's PCR and the requested duty cycle of the STA's WUR receiver.

Upon receiving the WUR Mode Request frame 1102, the AP 110 responds with a WUR Mode Response frame 1104. The WUR Mode Response frame 1104 indicates whether the STA's request for entering WUR mode is accepted or rejected. The WUR Mode Response frame 1104 may contain information on wake-up operating parameters if the AP 110 intends to change wake-up operating parameters, e.g., WUR Beacon interval and agreed duty cycle of the STA's WUR receiver. Upon receiving the WUR Mode Response frame 1104 from the AP 110, if the request for entering WUR mode is accepted, the STA transits to operate in WUR mode based on wake-up operating parameters most recently agreed by the AP 110 as illustrated in FIG. 11A. Otherwise the STA's power management mode remains unchanged. In this case, the STA changes the power management mode from PS mode to WUR mode in the first way of transiting to WUR mode as mentioned earlier.

When UL traffic is buffered at the STA, the STA transits to operate in PS mode since it cannot directly transit to operate in active mode from WUR mode and stays in awake state. The STA transmits a buffered Data frame with the Power Management subfield set to 1 at the head of transmit queue. If there is more buffered traffic, the More Data field in the Data frame is set to 1. Otherwise, the More Data field in the Data frame is set to 0. The AP 110 responds with an acknowledgement frame for acknowledging successful receipt of the Data frame. The acknowledgement frame is either an ACK frame or a BlockAck frame.

In particular, the STA transmits a Data frame 1112 with the More Data field set to 0 and with a piggybacked WUR mode request to the AP 110 for requesting to re-enter WUR mode. The WUR mode request is embedded in a field or subfield of the Data frame 1112 as illustrated in FIG. 16. In this case, the STA cannot negotiate new wake-up operating parameters.

Upon receiving the Data frame 1112 with the More Data field set to 0 and with the piggybacked WUR mode request from the STA, the AP 110 responds with an acknowledgement frame 1114 with a piggybacked WUR mode response. The WUR mode response is embedded in a field or subfield of the acknowledgement frame 1114 as illustrated in FIG. 14 or FIG. 15. In this case, the AP 110 cannot change wake-up operating parameters. Upon receiving the acknowledgement frame 1114 with a piggyback WUR mode response from the AP 110, the STA transits to operate in WUR mode based on wake-up operating parameters most recently agreed by the AP 110 as illustrated in FIG. 11A. In this case, the STA changes the power management mode from PS mode to WUR mode in the first way of transiting to WUR mode as mentioned earlier.

According to the ninth embodiment of the present disclosure, channel efficiency is improved compared with the second embodiment since transmission of a WUR Mode Request frame and a WUR Mode Response frame may not be required.

FIG. 11B illustrates an error recovery procedure 1100 by the STA according to the ninth embodiment of the present disclosure. According to the error recovery procedure 1100, the STA shall maintain a counter called RetryCounter. The procedure 1100 starts at step 1130. At step 1132, the STA initializes the value of RetryCounter to zero.

At step 1134, the STA determines whether an acknowledgement frame with a piggybacked WUR mode response is received successfully within a determined timeout interval after transmitting a Data frame with the More Data field set to 0 and with a piggybacked WUR mode request. If the acknowledgement frame with a piggybacked WUR mode response is received successfully within the determined timeout interval after transmitting the Data frame with the More Data field set to 0 and with a piggybacked WUR mode request, the STA transits to operate in WUR mode at step 1144 and then the procedure 1100 stops at step 1150. Otherwise, the STA increments the value of RetryCounter by one at step 1136. At step 1138, the STA ascertains whether the value of RetryCounter is less than the maximum number of permissible retransmissions of the Data frame with the More Data field set to 0 and with a piggybacked WUR mode request. If the value of RetryCounter reaches the maximum number of permissible retransmissions, the procedure 1100 stops at step 1150. Otherwise, the STA retransmits the Data frame with the More Data field set to 0 and with a piggybacked WUR mode request at step 1140 and the procedure 1100 jumps back to step 1134.

Tenth Embodiment

FIG. 12A illustrates example frame exchange for power management mode change between the AP 110 and a STA according to a tenth embodiment of the present disclosure. The tenth embodiment is compliant with the first aspect of the present disclosure. Namely, according to the eleventh embodiment, the STA operating in WUR mode can directly transit to operate in active or PS mode and vice versa.

At the beginning of frame exchange, the STA is supposed to operate in active or PS mode. The STA sends a WUR Mode Request frame 1202 to the AP 110 via its PCR for requesting to enter WUR mode for very low power operation. The WUR Mode Request frame 1202 may contain information on wake-up operating parameters if the STA intends to negotiate new wake-up operating parameters, e.g., the time required for turning on the STA's PCR and the requested duty cycle of the STA's WUR receiver. Upon receiving the WUR Mode Request frame 1202, the AP 110 responds with a WUR Mode Response frame 1204. The WUR Mode Response frame 1204 indicates whether the STA's request for entering WUR mode is accepted or rejected. The WUR Mode Response frame 1204 may contain information on agreed wake-up operating parameters if the AP intends to change wake-up operating parameters, e.g., WUR Beacon interval and agreed duty cycle of the STA's WUR receiver. Upon receiving the WUR Mode Response frame 1204 from the AP 110, if the request for entering WUR mode is accepted, the STA transits to operate in WUR mode based on wake-up operating parameters most recently agreed by the AP 110 as illustrated in FIG. 12A. Otherwise the STA's power management mode remains unchanged. In this case, the STA changes the power management mode from active or PS mode to WUR mode of transiting to WUR mode in the first way as mentioned earlier.

When DL traffic for the STA is buffered, the AP 110 will send a unicast wake-up frame 1210 to the STA. The wake-up frame 1210 indicates the change to active mode from WUR mode since a large amount DL traffic is buffered for the STA. Upon receiving the wake-up frame 1210 via its WUR, the STA transits to operate in active mode according to the mode change instruction in the received wake-up frame 1210; and then transmits an ACK frame 1212 with the Power Management subfield set to 0 to the AP 110, which acknowledges successful receipt of the wake-up frame 1210. In this case, the STA changes the power management mode from WUR mode to active or PS mode in the second way as mentioned above. Upon receiving the ACK frame 1212, the AP 110 transmits a buffered Data frame at the head of transmit queue. If there is more buffered traffic, the More Data field in the delivered Data frame is set to 1. Otherwise, the More Data field in the Data frame is set to 0. The STA responds with an acknowledgement frame for acknowledging successful receipt of the Data frame. The acknowledgement frame is either an ACK frame or a BlockAck frame.

In particular, upon receiving a Data frame 1214 with the More Data field set to 0, the STA transmits an acknowledgement frame 1216 to the AP 110 for successful receipt of the Data frame 1214 and then transits to operate in WUR mode based on wake-up operating parameters most recently agreed by the AP 110. Upon receiving the acknowledgement frame 1216, the AP 110 deduces that the STA has transited to operate in WUR mode. In this case, the STA changes the power management mode from active mode to WUR mode in the second way of transiting to WUR mode as mentioned earlier.

According to the tenth embodiment of the present disclosure, channel efficiency is improved compared with the first embodiment since transmission of a PS-Poll frame, a WUR Mode Request frame and a WUR Mode Response frame may not be required for entering WUR mode.

FIG. 12B illustrates an error recovery procedure 1200 performed by the AP 110 according to the tenth embodiment of the present disclosure. According to the error recovery procedure 1200, the AP 110 shall maintain a counter called RetryCounter. The procedure 1200 starts at step 1230. At step 1232, the AP 110 initializes the value of RetryCounter to zero.

At step 1234, the the AP 110 determines whether an acknowledgement frame is received successfully within a determined timeout interval after transmitting a Data frame with the More Data field set to 0. If the acknowledgement frame is received successfully within the determined timeout interval after transmitting the Data frame with the More Data field set to 0, the AP 110 supposes the STA has transited to operate in WUR mode at step 1244 and then the procedure 1200 stops at step 1250. Otherwise the AP 110 increments the value of RetryCounter by one at step 1236. At step 1238, the AP 110 ascertains whether the value of RetryCounter is less than the maximum number of permissible retransmissions of the Data frame with the More Data field set to 0. If the value of RetryCounter reaches the maximum number of permissible retransmissions, the procedure 1200 proceeds to step 1244. Otherwise, the AP 110 retransmits the Data frame with the More Data field set to 0 at step 1240 and then the procedure 1200 jumps back to step 1234.

Eleventh Embodiment

FIG. 13A illustrates example frame exchange for power management mode change between the AP 110 and a STA according to an eleventh embodiment of the present disclosure. The eleventh embodiment is compliant with the third aspect of the present disclosure. Namely, according to the eleventh embodiment, the STA operating in WUR mode cannot directly transit to operate in active mode and vice versa.

At the beginning of frame exchange, the STA is supposed to operate in PS mode. The STA sends a WUR Mode Request frame 1302 to the AP 110 via its PCR for requesting to enter WUR mode for very low power operation. The WUR Mode Request frame 1302 may contain information on wake-up operating parameters if the STA intends to negotiate new wake-up operating parameters, e.g., the time required for turning on the STA's PCR and the requested duty cycle of the STA's WUR receiver. Upon receiving the WUR Mode Request frame 1302, the AP 110 responds with a WUR Mode Response frame 1304. The WUR Mode Response frame 1304 indicates whether the STA's request for entering WUR mode is accepted or rejected. The WUR Mode Response frame 1304 may contain information on agreed wake-up operating parameters if the AP 110 intends to change wake-up operating parameters, e.g., WUR Beacon interval and agreed duty cycle of the STA's WUR receiver. Upon receiving the WUR Mode Response frame 1304 from the AP 110, if the request for entering WUR mode is accepted, the STA transits to operate in WUR mode based on wake-up operating parameters most recently agreed by the AP 110 as illustrated in FIG. 13A. Otherwise the STA's power management mode remains unchanged. In this case, the STA changes the power management mode from PS mode to WUR mode in the first way of transiting to WUR mode as mentioned earlier.

When UL traffic is buffered at the STA, the STA transits to operate in PS mode since it cannot directly transit to operate in active mode and stays in awake state. The STA transmits a buffered Data frame with the Power Management subfield set to 1 at the head of transmit queue. If there is more buffered traffic, the More Data field in the Data frame is set to 1. Otherwise, the More Data field in the Data frame is set to 0. The AP 110 responds with an acknowledgement frame for successful receipt of the Data frame. The acknowledgement frame is either an ACK frame or a BlockAck frame.

In particular, upon receiving the Data frame 1312 with the More Data field set to 0 from the STA, the AP 110 responds with an acknowledgement frame 1314 for successful receipt of the Data frame 1312 and deduces that the STA will transit to operate in WUR mode after receiving the acknowledgement frame 1314. Upon receiving the acknowledgement frame 1314 from the AP 110, the STA transits to operate in WUR mode based on wake-up operating parameters most recently agreed by the AP 110 as illustrated in FIG. 13A. In this case, the STA changes the power management mode from PS mode to WUR mode in the second way of transiting to WUR mode as mentioned earlier.

According to the eleventh embodiment of the present disclosure, channel efficiency is improved compared with the second embodiment since transmission of a WUR Mode Request frame and a WUR Mode Response frame may not be required.

FIG. 13B illustrates an error recovery procedure 1300 by the STA according to the eleventh embodiment of the present disclosure. According to the error recovery procedure 1300, the STA shall maintain a counter called Retry-Counter. The procedure 1300 starts at step 1330. At step 1332, the STA initializes the value of RetryCounter to zero.

At step 1334, the STA determines whether an acknowledgement frame is received successfully within a determined timeout interval after transmitting a Data frame with the More Data field set to 0. If the acknowledgement frame is received successfully within the determined timeout interval after transmitting the Data frame with the More Data field set to 0, the STA transits to operate in WUR mode at step 1344 and then the procedure 1300 stops at step 1350. Otherwise, the STA increments the value of RetryCounter by one at step 1336. At step 1338, the STA ascertains whether the value of RetryCounter is less than the maximum number of permissible retransmissions of the Data frame with the More Data field set to 0. If the value of RetryCounter reaches the maximum number of permissible retransmissions, the procedure 1300 stops at step 1350. Otherwise, the STA retransmits the Data frame with the More Data field set to 0 at step 1340 and the procedure 1300 jumps back to step 1334.

According to the present disclosure, whether a STA transmits a WUR Mode Request frame or a piggybacked WUR mode request depends on whether the STA intends to negotiate new wake-up operating parameters. For example, the STA transmits a WUR Mode Request frame if the STA intends to negotiate new wake-up operating parameters. Otherwise the STA may transmit a piggybacked WUR mode request.

According to the present disclosure, whether the AP 110 transmits a WUR Mode Response frame or a piggybacked WUR mode response depends on whether the AP 110 intends to change wake-up operating parameters. For example, the AP 110 transmits a WUR Mode Response frame if the AP 110 intends to change wake-up operating parameters. Otherwise, the AP 110 may transmit a piggybacked WUR mode response.

According to the present disclosure, after power management mode change operation is completed according to various embodiments, the STA transits to operate in WUR mode with the duty cycle operation of its WUR receiver starting with the WUR off period for better power save.

<An Example Format of ACK Frame with a Piggybacked WUR Mode Request or Response>

FIG. 14 illustrates an example format of an ACK frame 1400 with a piggybacked WUR mode request or response according to the present disclosure. The ACK frame 1400 comprises a Frame Control field 1402. The Frame Control field 1402 comprises a Type field which indicates that the ACK frame 1400 is a Control frame and further comprises a Subtype field which indicates that the ACK frame 1400 is piggybacked with a WUR mode request or response depending on whether it is transmitted by the STA or the AP 110. If the ACK frame 1400 is transmitted by the STA, it is piggybacked with a WUR mode request. Otherwise it is piggybacked with a WUR mode response.

<An Example Format of a BlockAck Frame with a Piggybacked WUR Mode Request or Response>

FIG. 15 illustrates an example format of a BlockAck frame 1500 with a piggybacked WUR mode request or response according to the present disclosure. The BlockAck frame 1500 comprises a BA Control field 1502. The BA Control field 1502 comprises a WUR Mode Request/Response field 1504. The WUR Mode Request/Response field 1504 is set to 1 to indicate that the BlockAck frame 1500 is piggybacked with a WUR mode request or response depending on whether it is transmitted by the STA or the AP 110; and set to 0 to indicate that the BlockAck frame 1500 is not piggybacked with a WUR mode request or response. If the BlockAck frame 1500 with the WUR Mode Request/Response field 1504 set to 1 is transmitted by the STA, it is piggybacked with a WUR mode request. Otherwise it is piggybacked with a WUR mode response.

~An Example Format of a Data Frame with a Piggybacked WUR Mode Request>

FIG. 16 illustrates an example format of a Data frame 1600 with a piggybacked WUR mode request according to the present disclosure. The Data frame 1600 comprises a Frame Control field 1602. The Frame Control field 1602 comprises a Type field which indicates that the Data frame 1600 is a Data frame and a Subtype field which indicates that the Data frame 1600 is a QoS Data frame piggybacked with a WUR mode request.

<An Example Format of a Wake-Up Frame>

FIG. 17 illustrates an example format of a wake-up frame 1700 according to the present disclosure. The wake-up frame 1700 comprises a Type field 1702, a BSS Color field 1704, a AID field 1706, a Mode Change Instruction field 1708 and a WUR Mode Response Present field 1710. The Type field 1702 indicates the type of the wake-up frame 1700, e.g., unicast wake-up frame, WUR Beacon frame or multicast wake-up frame. The BSS Color field 1704 indicates the identifier of the network 100. The AID field 1706 indicates the identifier of intended STA. When the wake-up frame 1700 is not a unicast wake-up frame, the AID field 1706 is not present. The Mode Change Instruction field 1708 field indicates whether the intended STA transits to operate in active or PS mode from WUR mode after receiving the wake-up frame 1700. The WUR Mode Response Presence field 1710 indicates whether the AP 110 will send a WUR mode response after receiving a WUR mode request from the intended STA.

<An Example Format of a WUR Action Frame>

FIG. 18 illustrates an example format of a WUR Action frame 1800 according to the present disclosure. The WUR Action frame 1800 comprises a MAC Header portion 1810 and a Frame Body portion 1820. The Frame Body portion 1820 comprises a WUR Action field 1822 and a Result Code field 1824. The WUR Action field 1824 indicates the type of the WUR Action frame 1800 e.g., WUR Mode Request frame 202 or WUR Mode Response frame 204. If the WUR Action frame 1800 is a WUR Mode Response frame 204, the Result Code field 1824 indicates whether the STA's request for entering WUR mode is accepted or rejected. and may comprise a WUR Mode element 1826. The WUR Mode element 1826 contains wake-up operating parameters, e.g., WUR Beacon interval, agreed duty cycle of the intended STA's WUR receiver, the intended STA's identifier used in unicast wake-up packet and frequency band and channel in which wake-up frame is transmitted.

<Configuration of a WUR Apparatus>

FIG. 19A is a simple block diagram of an example WUR 1900 which is capable of receiving wake-up signal. The WUR 1900 may be the WUR 134 in the STA 130 or the WUR 144 in the STA 140 as illustrated in FIG. 1. The WUR 1900 comprises a receiver 1910 and a receive signal processing circuitry 1920. The receiver 1910 is responsible for reception of wake-up signal, and the receive signal processing circuitry 1920 is responsible for processing the received wake-up signal.

FIG. 19B is a detailed block diagram of the example WUR 1900. The WUR 1900 further comprises a control circuitry 1930, which is used to control general MAC protocol operations. The receiver 1910 of the WUR 1900 comprises a PHY processing circuitry 1912, which is responsible for converting PPDUs received through antennas into MAC frames (e.g., wake-up frames or WUR Beacon frames). The receive signal processing circuitry 1920 of the WUR 1900 comprises a message processing circuitry 1922, which is responsible for processing the received MAC frames (e.g., parsing MAC Header, etc.) under the control of the control circuitry 1930 according to the various embodiments of the present disclosure and passing the corresponding MAC information to the control circuitry 1930.

The WUR 1900 may comprise many other components that are not illustrated, for sake of clarity, in FIG. 19A and FIG. 19B. Only those components that are most pertinent to the present disclosure are illustrated.

<Configuration of a PCR Apparatus>

FIG. 20A is a simple block diagram of an example PCR 2000 which is capable for transmitting and receiving standard IEEE 802.11 signal. The PCR 2000 may be the PCR 112 in the AP 110, the PCR 132 in the STA 130 or the PCR 142 in the STA 140 as illustrated in FIG. 1. In particular, the PCR 112 in the AP 110 is also capable for transmitting wake-up signal. The PCR 2000 comprises a transmission signal generating circuitry 2010, a transceiver 2020 and a receive signal processing circuitry 2030. The transmission signal generating circuitry 2010 is responsible for generating standard IEEE 802.11 signal and wake-up signal if applicable, the transceiver 2020 is responsible for transmitting the generated standard IEEE 802.11 signal and wake-up signal if applicable as well as receiving the standard IEEE 802.11 signal, and the receive signal processing circuitry 2030 is responsible for processing the received standard IEEE 802.11 signal.

FIG. 20B is a detailed block diagram of the example PCR 2000. The PCR 2000 further comprises a control circuitry 2040, which is used to control general MAC protocol operation. The transmission signal generating circuitry 2010 comprises a message generating circuitry 2012, which is responsible for generating MAC frames (e.g., Data frames, acknowledgement frames, WUR Action frames, wake-up frames and WUR Beacon frames) under the control of the control circuitry 2040 according to various embodiments of the present disclosure. The transceiver 2020 comprises a PHY processing circuitry 2022, which is responsible for formulating the generated MAC frames into PPDUs and transmitting them through antennas as well as converting PPDUs received through the antennas into MAC frames. The receive signal processing circuitry 2030 comprises a message processing circuitry 2032, which is responsible for processing the received MAC frames (e.g., parsing MAC Header, etc.) under the control of the control circuitry 2040 and passing the corresponding MAC information to the control circuitry 2040.

The PCR 2000 may comprise many other components that are not illustrated, for sake of clarity, in FIG. 20A and FIG. 20B. Only those components that are most pertinent to the present disclosure are illustrated.

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing, as a result of the advancement of semiconductor technology or other derivative technology.

Should a circuit integration technology replacing LSI appear as a result of advancements in semiconductor technology or other technologies derived from the technology, the functional blocks could be integrated using the future integrated circuit technology. Another possibility is the application of biotechnology and/or the like.

INDUSTRIAL APPLICABILITY

This disclosure can be applied to an apparatus and a method for changing power management mode in a wireless network.

REFERENCE SIGNS LIST

110 AP
130, 140 STA
112, 132, 142, 2000 PCR
134, 144, 1900 WUR
1910 Receiver
1912, 2022 PHY processing circuitry
1920, 2030 Receive signal processing circuitry
1922, 2032 Message processing circuitry
1930, 2040 Control circuitry
2010 Transmission signal generating circuitry
2012 Message generating circuitry
2020 Transceiver

The invention claimed is:

1. A station comprising:
   circuitry which, in operation, controls an operation of the station in a wake-up radio (WUR) mode to alternate between a WUR awake state and a WUR doze state; and
   a receiver which, when the station is in the WUR awake state, receives a WUR wake-up frame, and, when the station is in the WUR doze state, does not receive the WUR wake-up frame;
   wherein,
   in response to the receiver receiving the WUR wake-up frame, the circuitry finishes the operation of the station in the WUR mode and follows a power save (PS) operation; and
   the circuitry, without receiving the WUR wake-up frame, finishes the operation of the station in the WUR mode by transmitting a management frame indicating a finish of the operation.

2. The station according to claim 1, wherein in response to the receiver receiving the WUR wake-up frame, the circuitry elicits a transmission of buffered data from an access point (AP) in the PS operation.

3. The station according to claim 2, wherein the circuitry generates a PS poll frame which elicits the transmission of the buffered data from the AP in the PS operation.

4. The station according to claim 1, wherein the WUR wake-up frame includes an indication of group addressed buffered data.

5. The station according to claim 1, wherein the WUR wake-up frame includes an indication of individually addressed buffered data.

6. The station according to claim 1, wherein in response to the receiver receiving a frame indicating that more data is not buffered for the station at an access point (AP) in the PS operation, the station enters a doze state.

7. The station according to claim 1, comprising:
a transmitter which, in operation, transmits a frame;
wherein in response to the transmitter, in the PS operation, transmitting the frame indicating that more data is not buffered at the station, the station enters a doze state.

8. A communication method implemented by a station, the communication method comprising:
controlling an operation of the station in a wake-up radio (WUR) mode to alternate between a WUR awake state and a WUR doze state;
receiving a WUR wake-up frame when the station is in the WUR awake state, and not receiving the WUR wake-up frame when the station is in the WUR doze state;
in response to receiving the WUR wake-up frame, finishing the operation of the station in the WUR mode and controlling a power save (PS) operation of the station; and
without receiving the WUR wake-up frame, finishing the operation of the station in the WUR mode by transmitting a management frame indicating a finish of the operation.

9. The communication method according to claim 8, comprising:
eliciting a transmission of buffered data from an access point (AP) in the PS operation after the WUR wake-up frame is received.

10. The communication method according to claim 9, comprising:
generating a PS poll frame which elicits the transmission of the buffered data from the AP in the PS operation.

11. The communication method according to claim 8, wherein the WUR wake-up frame includes an indication of group addressed buffered data.

12. The communication method according to claim 8, wherein the WUR wake-up frame includes an indication of individually addressed buffered data.

13. The communication method according to claim 8, wherein in response to receiving a frame indicating that more data is not buffered for the station at an access point (AP) in the PS operation, the station enters a doze state.

14. The communication method according to claim 8, comprising:
transmitting a frame;
wherein when transmitting the frame indicating that more data is not buffered at the station in the PS operation, the station enters a doze state.

* * * * *